United States Patent
Deep et al.

(10) Patent No.: US 12,481,721 B2
(45) Date of Patent: Nov. 25, 2025

(54) REGULAR EXPRESSION DECOMPOSITION AND EVALUATION

(71) Applicant: Microsoft Technology Licensing, LLC, Redmond, WA (US)

(72) Inventors: Shaleen Deep, Madison, WI (US); Ling Zhang, Madison, WI (US); Avrilia Floratou, Sunnyvale, CA (US); Anja Gruenheid, Zurich (CH); Jignesh M. Patel, Madison, WI (US); Yiwen Zhu, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 116 days.

(21) Appl. No.: 18/146,370

(22) Filed: Dec. 24, 2022

(65) Prior Publication Data

US 2024/0211545 A1  Jun. 27, 2024

(51) Int. Cl.
*G06F 16/22* (2019.01)
*G06F 16/34* (2019.01)
*G06F 18/22* (2023.01)

(52) U.S. Cl.
CPC ............... *G06F 18/22* (2023.01); *G06F 16/34* (2019.01)

(58) Field of Classification Search
CPC ...................................................... G06F 16/34
See application file for complete search history.

(56) References Cited

U.S. PATENT DOCUMENTS

| | | | |
|---|---|---|---|
| 10,275,449 B1 * | 4/2019 | Hayes | G06F 40/205 |
| 2012/0005184 A1 | 1/2012 | Thilagar et al. | |
| 2015/0074034 A1 * | 3/2015 | Ait-Mohktar | G06F 16/835 |
| | | | 706/50 |
| 2016/0253378 A1 | 9/2016 | Marom | |
| 2018/0121410 A1 * | 5/2018 | Fregly | G06F 40/211 |

(Continued)

OTHER PUBLICATIONS

"8.5.7 'Posix-Basic' Regular Expression Syntax", Retrieved From: https://www.gnu.org/software/findutils/manual/html_node/find_html/posix_002dbasic-regular-expression-syntax.html, Oct. 7, 2022, 2 Pages.

(Continued)

*Primary Examiner* — Mohammad S Rostami
(74) *Attorney, Agent, or Firm* — Weaver IP L.L.C.

(57) ABSTRACT

Regular expression ("regex") decomposition and evaluation is disclosed. In an aspect of the disclosure, a literal component and a pattern component in a regex are determined. A plurality of evaluation processes is determined based on the regex, including a first evaluation process configured to identify text that matches the literal component and the pattern component. The evaluation processes are executed with respect to a sample of data to determine performance characteristics including a performance characteristic respective to each evaluation process. An evaluation process of the evaluation processes is selected based on the determined performance characteristics. The selected evaluation process is executed with respect to further data to retrieve results that satisfy the selected evaluation process. In another aspect, the pattern component is decomposed into subcomponents. In another aspect, the evaluation processes include an evaluation process that specifies a process to provide the regex to a regex engine for execution thereof.

20 Claims, 5 Drawing Sheets

(56) References Cited

U.S. PATENT DOCUMENTS

| | | | |
|---|---|---|---|
| 2018/0268081 A1* | 9/2018 | Kearney | G06F 40/284 |
| 2018/0375745 A1* | 12/2018 | Balupari | H04L 43/0876 |
| 2019/0384763 A1* | 12/2019 | Malak | G06F 40/126 |
| 2020/0117742 A1* | 4/2020 | Huang | G06F 16/24564 |
| 2020/0125746 A1* | 4/2020 | Joshi | G06F 21/6245 |
| 2020/0349202 A1* | 11/2020 | Shin | G06F 16/90344 |
| 2021/0182294 A1* | 6/2021 | Teen | G06F 16/24542 |
| 2021/0303724 A1* | 9/2021 | Goshen | G10L 15/197 |
| 2021/0326736 A1* | 10/2021 | Kishimoto | G06F 18/217 |
| 2021/0365802 A1* | 11/2021 | Sofer | G06F 16/2453 |
| 2022/0113969 A1* | 4/2022 | Chang | G06F 9/3887 |
| 2022/0292085 A1* | 9/2022 | Shahriar | G06N 20/00 |
| 2022/0414099 A1* | 12/2022 | Dutt | G06F 11/3409 |
| 2023/0046471 A1* | 2/2023 | Enuka | G06N 20/00 |
| 2023/0084069 A1* | 3/2023 | Cruanes | G06F 16/24557 707/705 |
| 2023/0214522 A1* | 7/2023 | Litvin | G06F 7/02 707/692 |
| 2023/0316098 A1* | 10/2023 | Sabapathy | G06N 20/20 706/12 |
| 2023/0325294 A1* | 10/2023 | Muthukrishnan | G06F 16/1734 709/224 |
| 2023/0342030 A1* | 10/2023 | Kumawat | G06F 3/0655 |

OTHER PUBLICATIONS

Antonello, et al., "Design and Optimizations for Efficient Regular Expression Matching in DPI systems", In Journal of Computer Communications, vol. 61, May 1, 2015.

Antonello, et al., "Deterministic Finite Automaton for Scalable Traffic Identification: The Power of Compressing by range", In Proceedings of IEEE Network Operations and Management Symposium, Apr. 16, 2012, pp. 155-162.

Becchi, et al., "A-DFA: A Time-and Space-Efficient DFA Compression Algorithm for Fast Regular Expression Evaluation", In Journal of ACM Transactions on Architecture and Code Optimization, vol. 10, Issue 1, Apr. 1, 2013, 26 Pages.

Becchi, et al., "An Improved Algorithm to Accelerate Regular Expression Evaluation", In Proceedings of 3rd ACM/IEEE Symposium on Architecture for Networking and Communications Systems, Dec. 3, 2007, pp. 145-154.

Brodie, et al., "A Scalable Architecture for High-Throughput Regular-Expression Pattern Matching", In Journal of ACM SIGARCH Computer Architecture News, vol. 34, Issues 2, May 1, 2006, 12 Pages.

Fan, et al., "Adding Regular Expressions to Graph Reachability and Pattern ueries", In Journal of Frontiers of Computer Science, vol. 6, Issue 3, Jun. 2012, pp. 313-338.

Hypolite, et al., "DeepMatch: Practical Deep Packet Inspection in the Data Plane Using Network Processors", In Proceedings of the 16th International Conference on Emerging Networking Experiments and Technologies, Dec. 1, 2020, pp. 336-350.

Kong, et al., "Efficient Signature Matching with Multiple Alphabet Compression Tables", In Proceedings of the 4th International Conference on Security and Privacy in Communication Netowrks, Sep. 22, 2008, 10 Pages.

Kumar, et al., "Algorithms to Accelerate Multiple Regular Expressions Matching for Deep Packet Inspection", In Journal of ACM SIGCOMM Computer Communication Review, vol. 36, Issue 4, Sep. 11, 2006, pp. 339-350.

Kumar, et al., "Curing Regular Expressions Matching Algorithms from Insomnia, Amnesia, and Acalculia", In Proceedings of the 3rd ACM/IEEE Symposium on Architecture for Networking and Communications Systems, Dec. 3, 2007, pp. 155-164.

Liu, et al., "A Fast String-Matching Algorithm for Network Processor-Based Intrusion Detection System", In Proceedings of ACM Transactions on Embedded Computing Systems vol. 3, Issue 3, Aug. 2004, pp. 614-633.

Liu, et al., "An Overlay Automata Approach to Regular Expression Matching", In Proceedings of IEEE Conference on Computer Communications, Apr. 27, 2014, pp. 952-960.

Lunteren, et al., "Designing a Programmable Wire-Speed Regular-Expression Matching Accelerator", In Conference of 45th Annual IEEE/ACM International Symposium on Microarchitecture, Dec. 1, 2012, pp. 461-472.

Martens, et al., "Bridging Theory and Practice with Query log Analysis", In Journal of ACM SIGMOD Record, vol. 48, Issue 1, Mar. 2019, pp. 6-13.

Mitra, et al., "Compiling pcre to fpga for Accelerating Snort ids", In Proceedings of the 3rd ACM/IEEE Symposium on Architecture for Networking and Communications Systems, Dec. 3, 2007, pp. 127-136.

Miura, et al., "Accelerating Regular Path Queries using FPGA.", In Proceedings of 10th International Workshop on Accelerating Analytics and Data Management Systems, Aug. 26, 2019, pp. 1-8.

Moosavi, et al., "Accident Risk Prediction Based on Heterogeneous Sparse Data: New Dataset and Insights", In Proceedings of the 27th ACM SIGSPATIAL International Conference on Advances in Geographic Information Systems, Nov. 5, 2019, 10 Pages.

Parravicini, et al., "Cicero: A Domain-Specific Architecture for Efficient Regular Expression Matching", In Proceedings of ACM Transactions on Embedded Computing Systems, Sep. 22, 2021, 24 Pages.

Rezig, et al., "DICE: Data Discovery by example", In Proceedings of the VLDB Endowment, vol. 14, Issue 12, Jul. 1, 2021, pp. 2819-2822.

Russo, et al., "A Tutorial on Thompson Sampling", In Journal of Foundations and Trends® in Machine Learning, vol. 11, Issue 1, Jul. 11, 2018, 96 Pages.

Sidler, et al., "Accelerating Pattern Matching Queries in Hybrid CPU-FPGA Architectures", In Proceedings of the ACM International Conference on Management of Data, May 14, 2017, 13 Pages.

Tata, et al., "Declarative Querying for Biological Sequences", In Proceedings of 22nd International Conference on Data Engineering, Apr. 3, 2006, 12 Pages.

Tuck, et al., "Deterministic Memory-Efficient String Matching Algorithms for Intrusion Detection", In Proceedings of IEEE INFOCOM, vol. 4, Mar. 7, 2004, pp. 2628-2639.

Xu, et al., "A Survey on Regular Expression Matching for Deep Packet Inspection: Applications, Algorithms, and Hardware platforms", In Journal of IEEE Communications Surveys & Tutorials, vol. 18, Issue 4, May 11, 2016, pp. 2991-3029.

Zhao, et al., "Achieving 100Gbps Intrusion Prevention on a Single Server", In Conference of 14th USENIX Symposium on Operating Systems Design and Implementation, Nov. 4, 2020, pp. 1083-1100.

Zhou, et al., "A Survey on Contextual Multi-Armed Bandits", In Journal of Computing Research Repository, Aug. 13, 2015, 43 Pages.

"Google/re2", Retrieved From: https://github.com/google/re2, Oct. 13, 2022, 2 Pages.

"Index of/jpcre2/", Retrieved From: https://docs.neuzunix.com/jpcre2/, Oct. 13, 2022, 1 Page.

"Network Intrusion Detection and Prevention System", Retrieved From: https://www.snort.org/, Oct. 11, 2022, 9 Pages.

"Suricata", Retrieved From: https://suricata.io/, Oct. 11, 2022, 4 Pages.

"Technical Notes about PCRE2.", Retrieved From: https://github.com/PCRE/pcre2/blob/6c941e3f778970b3012093da7bf888c875dd1739/HACKING, Oct. 11, 2022, 18 Pages.

Aho, et al., "Efficient String Matching: An Aid to Bibliographic Search", In Journal of Communications of the ACM, vol. 18, Issue 6, Jun. 1, 1975, pp. 333-340.

Aldwairi, et al., "Exscind: Fast Pattern Matching for Intrusion Detection Using Exclusion and Inclusion Filters", In Proceedings of 7th International Conference on Next Generation Web Services Practices. IEEE., Oct. 19, 2011, pp. 24-30.

Baker, et al., "Time and Area Efficient Pattern Matching on FPGAs", In Proceedings of the 12th International Symposium on Field Programmable Gate Arrays, Feb. 22, 2004, pp. 223-232.

(56) References Cited

OTHER PUBLICATIONS

Bando, et al., "Range hash for regular expression pre-filtering", In Proceedings of the 6th ACM/IEEE Symposium on Architectures for Networking and Communications Systems, Oct. 25, 2010, 12 Pages.

Becchi, et al., "Evaluating Regular Expression Matching Engines on Network and General Purpose Processors", In Proceedings of the 5th ACM/IEEE Symposium on Architectures for Networking and Communications Systems, Oct. 19, 2009, pp. 30-39.

Becchi, et al., "Memory-Efficient Regular Expression Search Using State Merging", In Proceedings of INFOCOM 26th IEEE International Conference on Computer Communications., May 6, 2007, pp. 1064-1072.

Calvanese, et al., "Rewriting of Regular Expressions and Regular Path Queries", In Proceedings of the eighteenth ACM SIGMOD-SIGACT-SIGART Symposium on Principles of Database Systems, May 1, 1999, pp. 194-204.

Cha, et al., "SplitScreen: Enabling Efficient, Distributed Malware Detection", In Journal of Communications and Networks, vol. 13, Issue 2, Apr. 13, 2011, pp. 187-200.

Chan, et al., "Re-tree: An Efficient Index Structure for Regular Expressions", In Journal of The VLDB Journal, vol. 12, Issue 2, Aug. 12, 2003, pp. 102-119.

Chandramouli, et al., "Trill: A High-Performance Incremental Query Processor for Diverse Analytics", In Proceedings of the VLDB Endowment, vol. 8 Issue 4, Dec. 1, 2014, pp. 401-412.

Florescu, et al., "Query Containment for Conjunctive Queries With Regular Expressions", In Proceedings of the seventeenth ACM SIGACT-SIGMOD-SIGART Symposium on Principles of Database systems, May 1, 1998, pp. 139-148.

Freydenberger, et al., "Joining Extractions of Regular Expressions", In Proceedings of the 37th ACM SIGMOD-SIGACT-SIGAI Symposium on Principles of Database Systems, May 27, 2018, 26 Pages.

Gibney, et al., "Text Indexing for Regular Expression Matching", In Journal of Algorithms, vol. 14, Issue 5, Apr. 23, 2021, 15 Pages.

Gogte, et al., "HARE: Hardware Accelerator for Regular Expressions", In Conference of 49th Annual IEEE/ACM International Symposium on Microarchitecture MICRO, Oct. 15, 2016, 12 Pages.

Hammel, et al., "Searching on the Secondary Structure of Protein Sequences", In Proceedings of the 28th International Conference on Very Large Databases, Jan. 1, 2002, 12 Pages.

Hamooni, et al., "Logmine: Fast Pattern Recognition for log Analytics", In Proceedings of the 25th ACM International on Conference on Information and Knowledge Management, Oct. 24, 2016, 10 Pages.

Huang, "Scalable TCAM-Based Regular Expression Matching with Com-Pressed Finite Automata", In Proceedings of Architectures for Networking and Communications Systems, Oct. 21, 2013, pp. 83-93.

Jamshed, et al., "Kargus: A Highly-Scalable Software-Based Intrusion Detection System", In Proceedings of the ACM conference on Computer and communications security, Oct. 16, 2012, 12 Pages.

Kandhan, et al., "SigMatch: Fast and Scalable Multi-Pattern Matching", In Proceedings of the VLDB Endowment, Sep. 2010, 12 Pages.

Kang, et al., "MithriLog: Near-Storage Accelerator for High-Performance Log Analytics", In Proceedings of 54th Annual IEEE/ACM International Symposium on Microarchitecture, Oct. 18, 2021, pp. 434-448.

Knuth, et al., "Fast Pattern Matching in Strings", In Journal of SIAM Journal on Computing, vol. 6, Issue 2, Jun. 1977, pp. 323-350.

Li, et al., "Repairing Data Through Regular Expressions", In Proceedings of the VLDB Endowment, vol. 9, Issue 5, Jan. 1, 2016, pp. 432-443.

Liu, et al., "Towards fast and optimal grouping of regular expressions via DFA size estimation", In Journal of IEEE on Selected Areas in Communications, vol. 32, Issue 10, Sep. 18, 2014, pp. 1797-1809.

Losemann, Katja, "Foundations of Regular Expressions in XML Schema languages and SPARQL", In Proceedings of the on SIGMOD/PODS PhD Symposium, May 20, 2012, pp. 39-44.

Lu, et al., "Speedup Your Analytics: Automatic Parameter Tuning for Databases and Big Data Systems", In Proceedings of the VLDB Endowment, vol. 12, Issue 12, Aug. 26, 2019, pp. 1970-1973.

Lunteren, Jan Van, "High-Performance Pattern-Matching for Intrusion Detection", In Proceedings INFOCOM 25th IEEE International Conference on Computer Communications, Apr. 23, 2006, pp. 1-13.

Martens, et al., "Evaluation and Enumeration Problems for Regular Path Queries", In Proceedings of 21st International Conference on Database Theory. Schloss Dagstuhl-Leibniz-Zentrum fuer Informatik, Mar. 26, 2018, 21 Pages.

Martens, et al., "Simple off The Shelf Abstractions for XML Schema", In Journal of ACM SIGMOD Record, vol. 36, Issue 3, Sep. 1, 2007, pp. 15-22.

Martens, Wim, "Towards Theory for Real-World Data", In Proceedings of the 41st ACM SIGMOD-SIGACT-SIGAI Symposium on Principles of Database Systems, Jun. 12, 2022, pp. 261-276.

Pedreira, et al., "Velox: Meta's Unified Execution Engine", In Proceedings of the VLDB Endowment, vol. 15, Issue 12, Aug. 1, 2022, pp. 3372-3384.

Russ Cox, "Regular Expression Matching with a Trigram Index or How Google Code Search Worked", Retrieved From : https://swtch.com/~rsc/regexp/regexp4.html, Jan. 2012, 7 Pages.

Sadowski, et al., "How Developers Search for Code: a Case Study", In Proceedings of the 10th joint meeting on foundations of software engineering, Aug. 30, 2015, pp. 191-201.

Siddiqui, et al., "From Sketching to Natural Language: Expressive Visual Querying for Accelerating Insight", In Journal ACM SIGMOD Record, vol. 50, Issue 1, Mar. 2021, pp. 51-58.

Sitaridi, et al., "SIMD-Accelerated Regular Expression Matching", In Proceedings of the 12th International Workshop on Data Management on New Hardware, Jun. 26, 2016, 7 Pages.

Tata, et al., "PiQA: An Algebra for Querying Protein Data Sets", In Proceedings of 15th International Conference on Scientific and Statistical Database Management, Jul. 9, 2003, 10 Pages.

Vasiliadis, et al., "MIDeA: a Multi-Parallel Intrusion Detection Architecture", In Proceedings of the 18th ACM conference on Computer and communications security, Oct. 17, 2011, 12 Pages.

Wang, et al., "Hyperscan: A Fast Multi-pattern Regex Matcher for Modern {CPUs}", In Conference of 16th USENIX Symposium on Networked Systems Design and Implementation, Feb. 26, 2019, pp. 631-648.

Wang, et al., "Reorganized and Compact Dfa for Eficient Regular Expression Matching", In Proceedings of IEEE International Conference on Communications, Jun. 5, 2011, 5 Pages.

Wang, et al., "Scalable and Cost-Efficient Multistring Pattern Matching With Programmable Switches", In Proceedings of IEEE/ACM Transactions on Networking, Sep. 2, 2022, pp. 1-16.

Wood, Peter T., "Query languages for graph databases", In Journal ACM Sigmod Record, vol. 41, Issue 1, Mar. 2012, pp. 50-60.

Xu, et al., "TFA: A tunable Finite Automaton for Pattern Matching in Network Intrusion Detection Systems", In Journal of IEEE on Selected Areas in Communications, vol. 32, Issue 10, Oct. 2014, pp. 1810-1821.

Yang, et al., "PiDFA: A Practical Multi-stride Regular Expression Matching Engine Based On FPGA", In Proceedings of International Conference on Communications, May 22, 2016, 7 Pages.

Younis, et al., "Multi-Byte Pattern Matching Using Stride-K DFA for High Speed Deep Packet Inspection", In 17th International Conference on Computational Science and Engineering, Dec. 19, 2014, pp. 547-553.

Yu, et al., "Fast and Memory-Efficient Regular Expression Matching for Deep Packet Inspection", In Proceedings of the ACM/IEEE symposium on Architecture for networking and communications systems, Dec. 3, 2006, pp. 93-102.

Zhang, et al., "Ensemble Machine learning: Methods and Applications", In Publication of Springer Science & Business Media, Feb. 17, 2012, 332 Pages.

International Search Report and Written Opinion received for PCT Application No. PCT/US2023/081712, Mar. 19, 2024, 16 pages.

(56) References Cited

OTHER PUBLICATIONS

International Preliminary Report on Patentability (Chapter I) received for PCT Application No. PCT/US2023/081712, mailed on Jul. 3, 2025, 10 pages.

* cited by examiner

600A

| 602 | Identify a first portion of text in a sample of data that matches a first literal component |

| 604 | Identify a second portion of text subsequent to the first portion of text that matches a first pattern component |

| 612 | Determine a second literal component in a regular expression |

Steps 304 and 602

| 614 | Identify a third portion of text subsequent to the second portion of text that matches the second literal component |

Step 604

| 622 | Decompose a first pattern component into a first pattern subcomponent, a second literal component, and a second pattern subcomponent |

Step 304 and 602

| 624 | Identify a second portion of text subsequent to a first portion of text, the second portion of text comprising a first sub-portion that matches the first pattern subcomponent, a second sub-portion that matches the second literal component, and a third sub-portion that matches the second pattern subcomponent |

| 632 | Provide a regular expression to a regular expression engine for execution thereof |

FIG. 6D

REGULAR EXPRESSION DECOMPOSITION AND EVALUATION

BACKGROUND

Regular expression, or "regex", is used to extract information from large corpus of formatted text by finding patterns of interest. For example, a large-scale cloud provider system may use operational logs to determine usage characteristics and/or identify potential performance issues. These operational logs can be very large in volume, and in some cases are unstructured. Exploratory data analysis methods may be used to extract structured information from these logs. For instance, a regular expression engine (also referred to as a "regex evaluation engine") executes regular expressions to identify patterns of interest in logs and retrieve structured information.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments described herein provide decomposition and evaluation of regular expressions. In an aspect of the present disclosure, a first literal component and a first pattern component in a regular expression are determined. A plurality of evaluation processes is determined based on the regular expression. The evaluation processes include a first evaluation process configured to identify text that matches the first literal component and the first pattern component. The evaluation processes are executed with respect to a sample of data to determine performance characteristics. The determined performance characteristics include a determined performance characteristic respective to each evaluation process of the evaluation processes. An evaluation process of the evaluation processes is selected based on the determined performance characteristics. The selected evaluation process is executed with respect to further data to retrieve results that satisfy the selected evaluation process.

In a further aspect of the present disclosure, a second literal component in the regular expression is determined. In this further aspect, the first evaluation process is configured to identify text that matches the first literal component, the first pattern component, and the second literal component.

In a further aspect of the present disclosure, the first pattern component is decomposed into a first pattern subcomponent, a second literal component, and a second pattern component. In this further aspect, the first evaluation process is configured to identify text that matches the first literal component, the first pattern subcomponent, the second literal component, and the second pattern subcomponent.

In a further aspect of the present disclosure, the plurality of evaluation processes includes a second evaluation process that specifies a process to provide the regular expression to a regular expression engine for execution thereof.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

FIG. 6A shows a flowchart of a process for executing an evaluation process with respect to a sample of data in accordance with an embodiment.

FIG. 6B shows a flowchart of a process for executing an evaluation process with respect to a sample of data in accordance with an embodiment.

FIG. 6C shows a flowchart of a process for executing an evaluation process with respect to a sample of data in accordance with an embodiment.

FIG. 6D shows a flowchart of a process for executing an evaluation process with respect to a sample of data in accordance with an embodiment.

Figure 1:
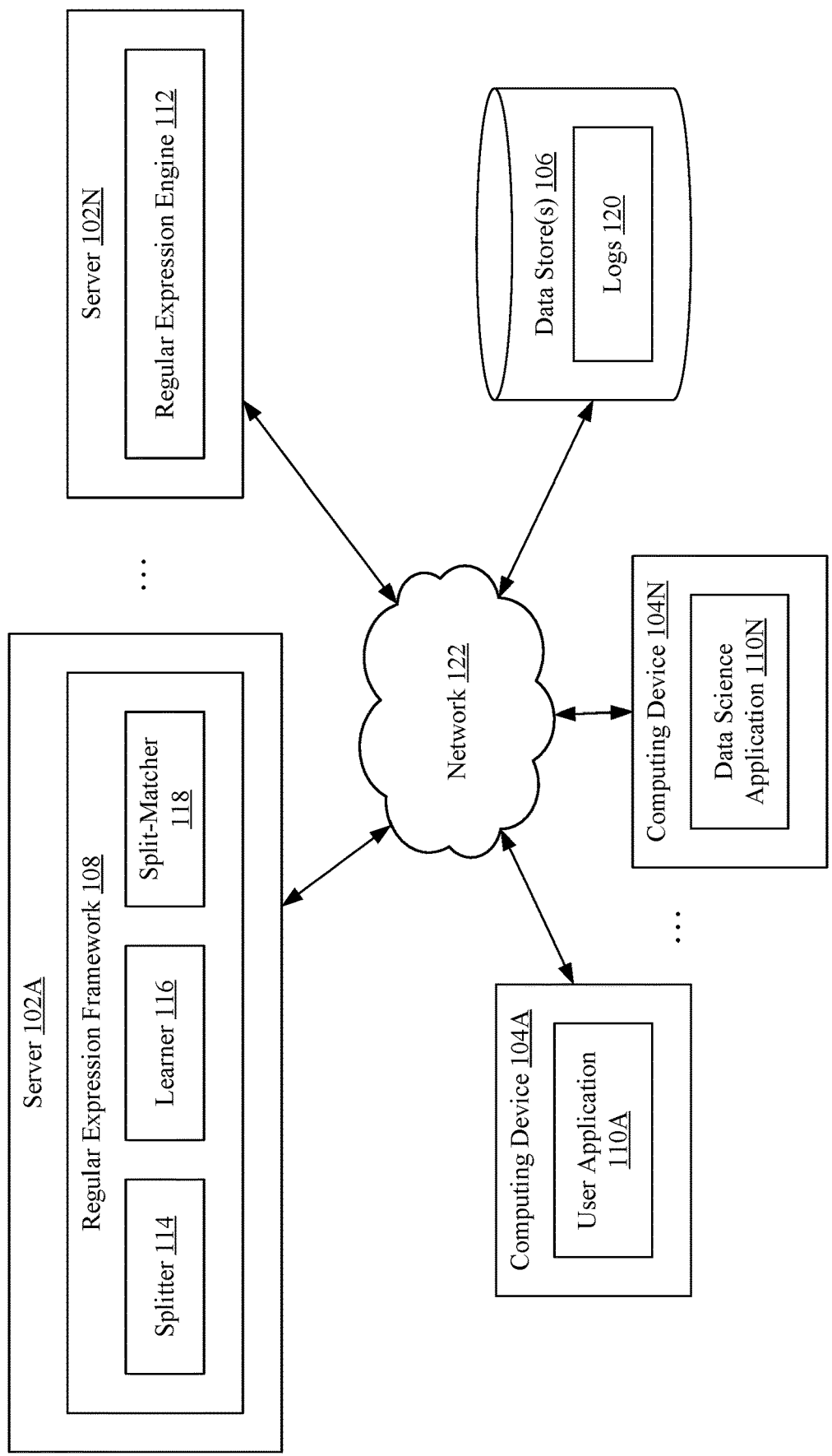
FIG. 1 shows a block diagram of a system for regular expression decomposition and evaluation in accordance with an example embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

As set forth in the Background section, regular expression, or "regex", is used to extract information from large corpus of formatted text by finding patterns of interest. For example, a large-scale cloud provider system may use operational logs to determine usage characteristics and/or identify potential performance issues. These operational logs can be very large in volume, and in some cases are unstructured. Exploratory data analysis methods may be used to extract structured information from these logs. For instance, a regular expression engine (also referred to as a "regex evaluation engine") executes regular expressions (sequences of characters that define a search pattern in text) to identify patterns of interest in logs and retrieve structured information.

However, regular expression engines are presented with several challenges. For instance, as mentioned above, operational logs can be large in volume. As such, evaluating a regular expression on an entire operational log can take a long time and consume significant compute resources. Some techniques of optimizing regex evaluation convert literal components (also referred to as "string components") into a state. Performing and tracking this conversion with respect to a substring can lead to inefficiencies in regular expression evaluation.

Embodiments described herein provide a framework for decomposition and evaluation of regular expressions. The framework is a "regular expression framework" (a regex evaluation system) that interfaces with a regular expression engine in a manner that improves regular expression matching. Embodiments identify pattern components (also referred to as "regex components") and literal components (e.g., "string components") in a regular expression (also referred to as "decomposing a regular expression"). A plurality of evaluation processes is determined based on the regular expression. For example, a determined evaluation process in accordance with an embodiment is configured to identify text that matches identified pattern and literal components. Embodiments execute the evaluation processes with respect to a sample of data (e.g., a portion of a log) to determine performance characteristics of each evaluation process. An evaluation process is selected based on the determined performance characteristics. The selected evaluation process is executed with respect to further data (e.g., the remaining portion of the log) to retrieve results that satisfy the selected evaluation process.

Embodiments described herein may be configured to utilize any underlying regular expression engine. For instance, a regular expression framework provides pattern components to a regular expression engine for evaluation with respect to a sample of data, or a portion of the sample of data. The regular expression framework may be configured in a manner that enables the framework to provide pattern components to any regular expression engine. By configuring the regular expression framework in this manner, compatibility is maintained as a regular expression engine is updated or changes are made to the engine's code. Moreover, modifications to the framework may be made without interfering with the regular expression engine code.

Methods, systems, and computer program products are provided for decomposition and evaluation of regular expressions. Embodiments described herein may select an evaluation process while reducing reliance on (or without relying on) statistics or catalogs. In other words, techniques described herein select an evaluation process for evaluating a regular expression in a manner that enables efficient selection of an evaluation process with respect to an ad-hoc log. For example, as discussed elsewhere herein, embodiments of the present disclosure implement a learning phase that learns which evaluation process to select for executing with respect to data (e.g., an operational log).

Embodiments may be configured in various ways in various environments. For instance, FIG. 1 shows a block diagram of a system 100 for regular expression decomposition and evaluation. As shown in FIG. 1, system 100 includes servers 102A-102N, computing devices 104A-104N, and one or more data stores 106 ("data store 106" hereinafter). Server 102A includes a regular expression framework 108 and server 102N includes a regular expression engine 112. Regular expression framework 108 includes a splitter 114, a learner 116, and a split-matcher 118. In embodiments, servers 102A-102N, computing devices 104A-104N, and data store 106 are communicatively coupled via one or more networks 122 ("network 122" hereinafter), comprising one or more of local area networks (LANs), wide area networks (WANs), enterprise networks, the Internet, etc., and including one or more of wired and/or wireless portions.

Data store 106 maintains data accessible to one or more components of system 100. Examples of data store 106 include, but are not limited to, a database, a file repository, and/or any other type of storage suitable for storing data described herein. Examples of data maintained by data store 106 include, but are not limited to, logs (changelogs, operational logs, etc.), data files (e.g., documents), database objects (e.g., tables, directories, etc.), structured data, unstructured data, semi-structured data, data containers, etc. As shown in FIG. 1, data store 106 stores logs 120, as discussed further below.

Computing devices 104A-104N include any computing devices of users (e.g., individual users, family users, enterprise users, governmental users, developers, data scientists, service team users, etc.) that may access network-accessible resources such as servers 102A-102N over network 122. System 100 may include fewer or more computing devices than depicted in FIG. 1. Computing devices 104A-104N may each be any type of stationary or mobile processing device, including, but not limited to, a desktop computer, a server, a mobile or handheld device (e.g., a tablet, a personal data assistant (PDA), a smart phone, a laptop, etc.), an Internet-of-Things (IOT) device, etc. Each of computing devices 104A-104N store data and execute computer programs, applications, and/or services. For example, computing device 104A as shown in FIG. 1 includes a user application 110A that enables a user to interface with cloud services of a cloud service platform. A user of computing device 104A may enter input via user application 110A or otherwise interact with user application 110A to utilize cloud services. In accordance with an embodiment, the user's activity with respect to application 110A is recorded in a log of logs 120. As also shown in FIG. 1, computing device 104N includes a data science application 110N that enables a user to perform data scientist operations with respect to the logs 120, as described herein. Example data scientist operations include, but are not limited to, analyzing the deployment of virtual machines in a cloud computing system, identifying user issues for a cloud database application, and/or any other diagnostic and/or analytic operations that may be performed with respect to database applications, cloud computing systems, or data science applications. In accordance with an embodiment, a user utilizes data science application 110N to submit a regular expression query to regular expression framework 108. The regular expression query includes a regular expression and indicates which data the regular expression framework is to use for evaluating the regular expression. For example, a regular expression query in a non-limiting example includes a regular expression and indicates that regular expression framework 108 is to evaluate the regular expression with respect to a log of logs 120.

Servers 102A-102N and any additional resources define a network accessible server infrastructure. In example embodiments, servers 102A-102N form a network-accessible server set, such as a cloud computing server network. For example, servers 102A-102N in accordance with an embodiment comprise a group or collection of servers (e.g., computing devices) that are each accessible by a network such as the Internet (e.g., in a "cloud-based" embodiment) to store, manage, and process data. System 100 may include any number of servers, fewer or greater than the number of servers 102A-102N shown in FIG. 1. Each of servers 102A-102N are configured to execute one or more services (including microservices), applications, and/or supporting services. A "supporting service" is a cloud computing service/application that manages a set of servers (e.g., a cluster of servers) to operate as network-accessible (e.g., cloud-based) computing resources for users. Examples of supporting services. Examples of supporting services include Microsoft® Azure®, Amazon Web Services™, Google Cloud Platform™, IBM® Smart Cloud, etc. A supporting service may be configured to build, deploy, and manage applications and services on the corresponding set of servers. Each instance of the supporting service may implement and/or manage a set of focused and distinct features or functions on the corresponding server set, including virtual machines, operating systems, application services, storage services, database services, messaging services, etc. Supporting services may be coded in any programming language. Each of servers 102A-102N may be configured to execute any number of services and/or other resources. For example, regular expression framework 108 and regular expression engine 112 in accordance with an embodiment are implemented as services executed by respective servers 102A and 102N. Furthermore, in accordance with another embodiment, regular expression framework 108 is implemented by multiple servers other than (or including) server 102A. In accordance with another embodiment, regular expression framework 108 and regular expression engine 112 are implemented by the same server.

Regular expression engine 112 is any kind of regular expression engine suitable for evaluating regular expressions. Examples of regular expression engine 112 include, but are not limited to, the Perl Compatible Regular Expression library (e.g., PCRE2) and RE2; however, embodiments described herein may utilize other types of regular expression engines. In accordance with an embodiment, regular expression engine 112 receives a call to evaluate a regular expression (or a pattern component(s)) with respect to input data (e.g., data corresponding to data stored in data store 106, a sample of data, a log line, a substring of a log line, and/or any other type of data, size of data, and/or subset of data described elsewhere herein). Regular expression engine 112 searches the input data and attempts to identify text that matches the regular expression (or the pattern component(s)) in the input data. Regular expression engine 112 returns identified text as a response to the call. If no text is identified, regular expression engine 112 returns a response indicating no match was made. Additional details regarding identifying text that matches pattern components and/or regular expressions by utilizing regular expression engine 112 are described with respect to FIGS. 6A, 6C, and 6D, as well as elsewhere herein.

Regular expression framework 108 receives regular expression queries and evaluates regular expressions included in such queries with respect to regular expression engine 112 and data (e.g., logs 120). As shown in FIG. 1, regular expression framework 108 includes splitter 114, learner 116, and split-matcher 118. Splitter 114 decomposes regular expressions in a received regular expression query. For instance, splitter 114 determines one or more literal components and one or more pattern components in a regular expression. In embodiments, literal components represent strings within a regular expression that would be suitable for matching using a string matching algorithm and pattern components represent a portion of the regular expression that is to be evaluated by regular expression engine 112.

As a non-limiting example, suppose a regular expression query includes the following regular expression:

$$clusterName = [0-9]\{4\} - [a-z]\{8\} \qquad \text{RegEx 1}$$

In this context, splitter 114 identifies string characters at the beginning of RegEx 1 and determines that RegEx 1 includes a first literal component "clusterName=". Splitter 114 also identifies a first pattern component "[0-9]{4}-[a-z]{8}". In this manner, splitter 114 determines a "2-way split" where RegEx 1 is split into a first literal component and a first pattern component. In accordance with an embodiment, splitter 114 splits a regular expression into literal and/or pattern components that include a "null component", or a component with no characters. For example, with continued reference to RegEx 1, splitter 114 in accordance with an embodiment splits RegEx 1 into a first literal component "clusterName=", a first pattern component "[0-9]{4}-[a-z]{8}", and a second literal component subsequent to the first pattern component that is null. In some embodiments, splitter 114 may identify multiple literal components (and/or pattern components) that are null. Furthermore, splitter 114 in accordance with an embodiment splits a component into multiple subcomponents. For instance, with continued reference to RegEx 1, splitter 114 in accordance with an embodiment splits the first pattern component into a first pattern subcomponent "[0-9]{4}", a second literal component "-", and a second pattern subcomponent "[a-z]{8}". Implementations of splitter 114 may be configured to determine any number of components, subcomponents, and/or groups of components and/or subcomponents in a regular expression. Additional details regarding the decomposition of regular expressions are discussed further below with respect to FIGS. 2, 3, 6B, and 6C.

Learner 116 determines evaluation processes for evaluating a regular expression based on the regular expression. Moreover, learner 116 determines evaluation processes based on the literal and/or pattern components determined by splitter 114. For instance, learner 116 receives the literal and pattern components determined by splitter 114 and determines various techniques for evaluating the components with respect to data to satisfy the regular expression query. Each evaluation process is configured to identify text in data that satisfies the regular expression query. Learner 116 may determine multiple types of evaluation processes, including, but not limited to, a direct evaluation process, a 2-way split evaluation process, a 3-way split evaluation process, and a multi-way evaluation process. As described herein, a direct evaluation process is an evaluation process that is configured to provide a regular expression to a regular expression engine for evaluation thereof, a 2-way split evaluation process is an evaluation process that is configured to identify text that matches a first literal component and a first pattern component, a 3-way split is an evaluation process that is configured to identify text that matches a first literal component, a first pattern component, and a second literal component, and a multi-way split is an evaluation process that is configured to identify text that matches four or more components (e.g., two literal components and two pattern components, three literal components and two pattern components, three literal components and three pattern components, etc.). Additional details regarding the determination of evaluation processes are described further below with respect to FIGS. 2, 3, 6B, and 6C.

Learner 116 also executes the evaluation processes with respect to a sample of data to determine performance characteristics including a determined performance characteristic respective to each evaluation process of the plurality of evaluation processes. As described herein, an evaluation process is configured to identify text that matches a regular expression or that matches one or more literal components and one or more pattern components. Learner 116 in accordance with an embodiment uses a string matching algorithm to identify text that matches one or more literal components. Furthermore, learner 116 in this example identifies text that matches one or more pattern components by providing the pattern component(s) to regular expression engine 112 for evaluation thereof. For example, with reference to RegEx 1 above, in a 2-way (or 3-way) split evaluation process, the first pattern component "[0-9]{4}-[a-z]{8}" is provided to regular expression engine 112 for evaluation thereof. In this example, "[0-9]{4}" specifies any four numeric characters from 0 to 9, "-" specifies the string character "-", and "[a-z]{8}" specifies any eight alphabetic characters from a to z. For instance, regular expression engine 112 in accordance with an embodiment identifies text "1234-abcdefgh" that matches the first pattern component. Learner 116 determines performance characteristics of an evaluation process based on the execution thereof. In accordance with an embodiment, split-matcher 118 executes the evaluation processes on behalf of learner 116. Additional details regarding the execution of evaluation processes to determine performance characteristics are discussed with respect to FIGS. 2-6D.

Learner 116 further selects an evaluation process based on the determined performance characteristics. By selecting an evaluation process based on performance characteristics that are determined by executing the various evaluation processes, learner 116 is able to determine an optimal evaluation process for executing with respect to data (e.g., a log of logs 120). Additional details regarding the selection of an evaluation process are discussed with respect to FIGS. 2, 3, and 5.

Split-matcher 118 executes the selected evaluation process with respect to further data to retrieve results that satisfy the selected evaluation process. For example, as discussed above, learner 116 selects an evaluation process of determined evaluation processes based on execution of the determined evaluation processes with respect to a sample of data. Split-matcher 118 executes the selected evaluation process with respect to further data that is associated with the sample of data. For instance, suppose the sample of data is the first 40 lines of a log of logs 120. In this context, split-matcher 118 executes the evaluation process selected by learner 116 with respect to the remaining lines of the log of logs 120. Additional details regarding the execution of the selected evaluation process are discussed further below with respect to FIGS. 2 and 3.

Figure 2:
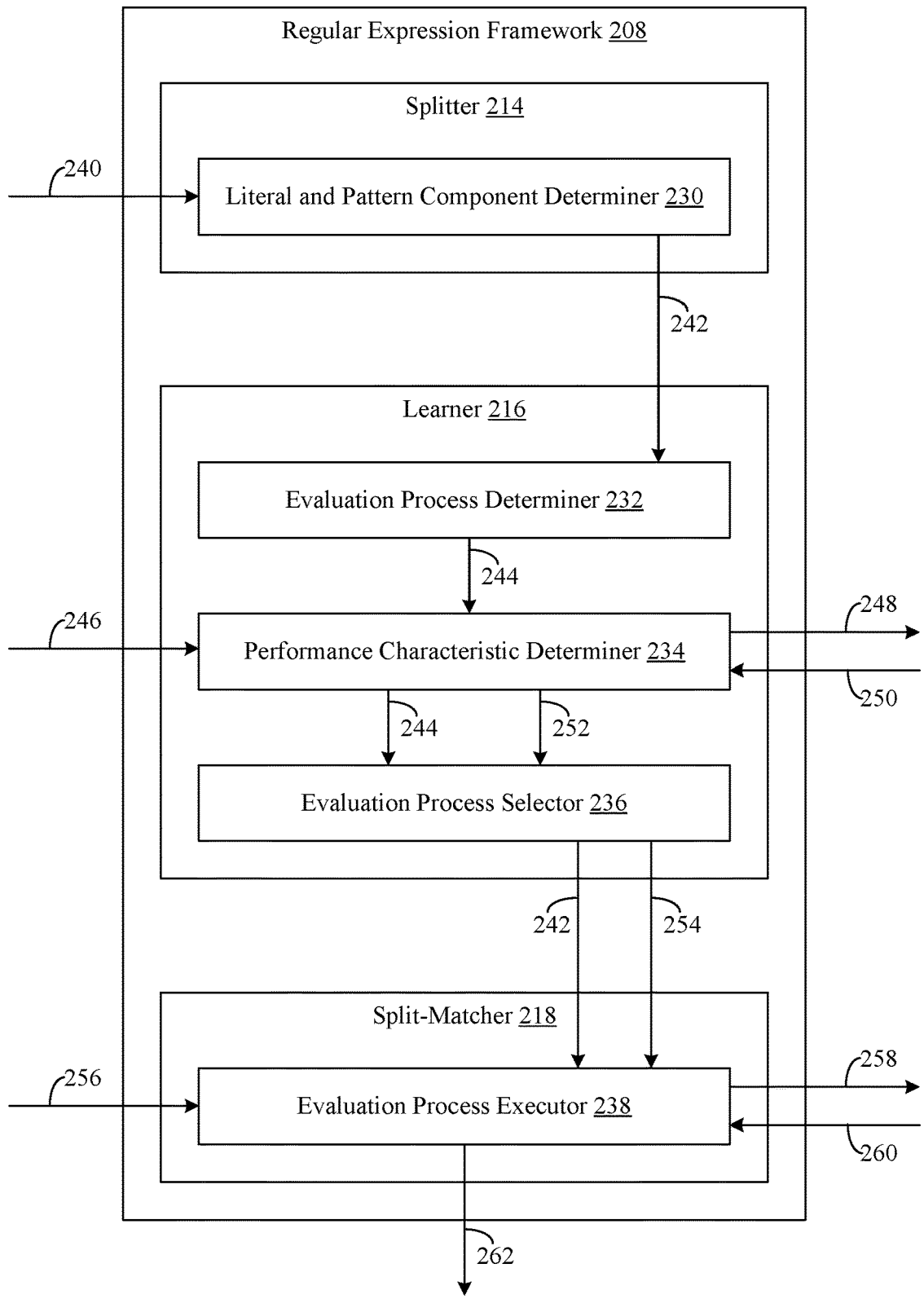
FIG. 2 shows a block diagram of a regular expression framework in accordance with an example embodiment.

As described above, embodiments described herein provide a framework that interfaces with a regular expression engine to efficiently determine and execute an evaluation process with respect to data (e.g., operation logs). The framework may operate in various ways, in embodiments. For example, FIG. 2 shows a block diagram of a regular expression framework 208 in accordance with an example embodiment. Regular expression framework 208 is an example embodiment of regular expression framework 108, as described above with respect to system 100 of FIG. 1 and is configured to interface with one or more regular expression engines, such as but not limited to, regular expression engine 112 of FIG. 1. As shown in FIG. 2, regular expression framework 208 includes a splitter 214, a learner 216, and a split-matcher 218, each of which are respective further embodiments of splitter 114, learner 116, and split-matcher 118, as described above with respect to FIG. 1. As also shown in FIG. 2, splitter 214 includes a literal and pattern component determiner 230, learner 216 includes an evaluation process determiner 232, a performance characteristic determiner 234, and an evaluation process selector 236, and split-matcher 218 includes an evaluation process executor 238.

Figure 3:
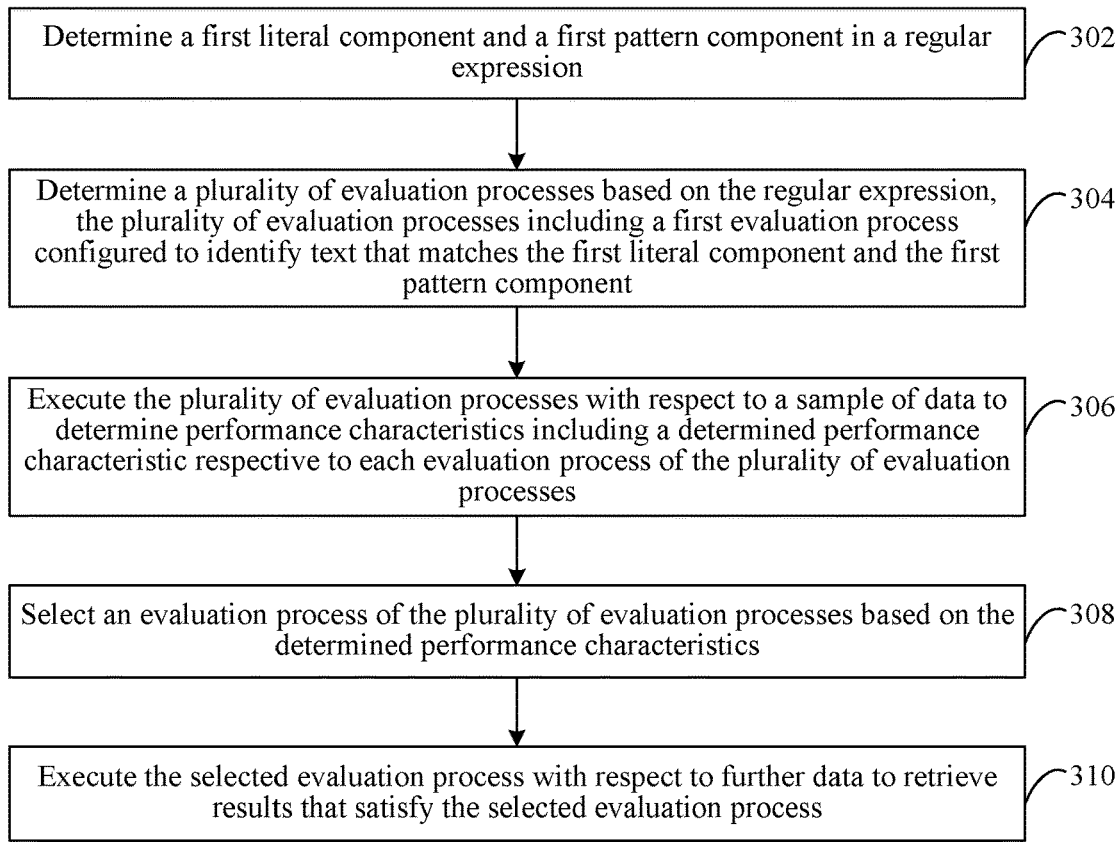
FIG. 3 shows a flowchart of a process for regular expression decomposition and evaluation in accordance with an embodiment.

For illustrative purposes, regular expression framework 208 is described with respect to FIG. 3. FIG. 3 shows a flowchart 300 of a process for selecting and executing an evaluation process with respect to data in accordance with an embodiment. Regular expression framework 208 of FIG. 2 may operate according to flowchart 300, in embodiments. Not all steps of flowchart 300 need be performed in all embodiments. Further structural and operational embodiments will be apparent to persons skilled in the relevant art(s) based on the following descriptions of FIGS. 2 and 3.

Flowchart 300 begins with step 302. In step 302, a first literal component and a first pattern component are determined in a regular expression. For example, literal and pattern component determiner 230 of FIG. 2 receives a regular expression query 240 from a computing device (e.g., computing device 104N of FIG. 1). Regular expression query 240 includes a regular expression, and optionally any other information associated with the query. For instance, regular expression query 240 in accordance with an embodiment includes an indication that regular expression framework 108 is to evaluate the included regular expression with respect to data (e.g., a log of logs 120). Literal and pattern component determiner 230 analyzes regular expression 240 to determine one or more literal components and one or more pattern components in regular expression 240. By determining various literal and pattern components in a regular expression, pattern component determiner 230 generates "splits" (e.g., as described above with respect to splitter 114 of FIG. 1) that can be evaluated with respect to data (e.g., logs).

Literal and pattern component determiner 230 determine various literal components, pattern components, and/or groups thereof. For example, as described in flowchart 300, literal and pattern component determiner 230 determines a first literal component and a first pattern component in the regular expression included in regular expression query 240. In accordance with an embodiment, the first literal component corresponds to a string portion of the regular expression that is prior to the first pattern component. In other words, the first literal component is a "prefix" of the first pattern component. Alternatively, the first literal component corresponds to a string portion of the regular expression that is subsequent to the first pattern. In other words, the first literal component is a "suffix" of the first pattern component. As described elsewhere herein, literal and pattern component determiner 230 in accordance with one or more embodiments determines more than one literal component and/or more than one pattern component in the regular expression. Additional details regarding determining additional literal and/or pattern components are described below with respect to FIGS. 6B and 6C. As shown in FIG. 2, literal and pattern component determiner 230 provides the determined literal and pattern components 242 ("components 242" hereinafter) to evaluation process determiner 232 and flowchart 300 proceeds to step 304.

In step 304, a plurality of evaluation processes is determined based on the regular expression. The plurality of evaluation processes includes a first evaluation process configured to identify text that matches the first literal component and the first pattern component. For instance, evaluation process determiner 232 of FIG. 2 determines a plurality of evaluation processes 244 based on the regular expression included in regular expression query 240. Furthermore, evaluation process determiner 232 may determine plurality of evaluation processes 244 based on components 242 determined in step 302. Each evaluation process is configured to identify text that satisfies the regular expression. For instance, as noted above, a first evaluation process is configured to identify text that matches a first literal component and a first pattern component. Evaluation processes described herein may be configured to identify text that matches any number of literal and/or pattern components. Moreover, and as described below with respect to FIG. 6D, an evaluation process may be configured to provide a regular expression to a regular expression engine for evaluation thereof. As shown in FIG. 2, evaluation process determiner 232 provides plurality of evaluation processes 244 to performance characteristic determiner 234 and flowchart 300 proceeds to step 306. Evaluation process determiner 232 may also provide components 242 to performance characteristic determiner 234.

In step 306, the plurality of evaluation processes is executed with respect to a sample of data to determine performance characteristics including a determined performance characteristic respective to each evaluation process of the plurality of evaluation processes. For instance, performance characteristic determiner 234 obtains a sample of data 246 ("sample 246" hereinafter) and executes plurality of evaluation processes 244 with respect to sample 246 to determine performance characteristics 252. Sample 246 is a sample of data that regular expression 240 is to be evaluated on. For instance, sample 246 in accordance with an embodiments is a sample of a log of logs 120 of FIG. 1. In this context, sample 246 includes a subset of lines in the log (e.g., the first of a number of lines in the log or a (e.g., randomly) selected number of lines in the log). The execution of the plurality of evaluation processes and determination of performance characteristics is also referred to as the "learning" phase herein. In other words, performance characteristic determiner 234 and evaluation process selector 236 learn the performance characteristics of each evaluation process of evaluation processes 244 during this phase.

Evaluation processes 244 may be executed in various ways, in embodiments. For instance, performance characteristic determiner 234 in accordance with an embodiment determines if text that matches literal and/or pattern components of components 244 is present in sample 246 (or a subset of sample 246) by executing evaluation processes. In accordance with one or more embodiments, performance characteristic determiner 234 uses a string matching algorithm to identify text that matches one or more literal components of components 244. In accordance with one or more embodiments, performance characteristic determiner 234 identifies text that matches a pattern component of components 244, multiple pattern components (and/or pattern subcomponents) of components 244, and/or the regular expression included in regular expression query 240 by providing the components, subcomponents and/or regular expression to a regular expression engine (e.g., regular expression engine 112 of FIG. 1) for evaluation thereof. For example, as shown in FIG. 2, performance characteristic determiner 234 provides a call 248 to regular expression engine 112 (not shown in FIG. 2). In this context, call 248 includes one or more pattern components (and/or subcomponents) of components 244 or the regular expression included in regular expression query 240. Call 248 also indicates sample 246 or a subset of sample 246 that regular expression engine 112 is to evaluate with respect to the included components or expression. Regular expression engine 112 evaluates components or regular expression in call 248 with respect to the sample or subset of the sample and provides a response 250. If there is a match, response 250 includes the text that satisfies the components, subcomponents, or expression. Alternatively, response 250 indicates a location of the text in sample 246 (e.g., the position(s) of one or more characters). If there is not a match, response 250 includes an indication that no match was located.

Performance characteristic determiner 234 determines various performance characteristics based on the execution of an evaluation process of evaluation processes 244. For instance, performance characteristic determiner 234 may be configured to determine the time to execute an evaluation process, resources used to execute an evaluation process, errors in execution of evaluation process, impact of errors, a cost of executing an evaluation process, and/or the like.

The execution of evaluation processes 244 in step 306 has been described with respect to performance characteristic determiner 234 executing evaluation processes 244; however, it is also contemplated herein that another component of learner 216 or regular expression framework 208 may execute evaluation processes 244 on behalf of performance characteristic determiner 234. For example, evaluation process executor 238 in accordance with an embodiment executes evaluation processes 244 on behalf of performance characteristic determiner 234. In this context, performance characteristic determiner 234 provides evaluation process executor 238 with the evaluation process that is to be executed and optionally indicates to execute the evaluation process with respect to a portion of sample 246. Evaluation process executor 238 identifies text in a similar manner described above with respect to performance characteristic determiner 234 and provides performance characteristic determiner 234 with the results of the execution.

In step 308, an evaluation process of the plurality of evaluation processes is selected based on the determined performance characteristics. For example, evaluation process selector 236 selects an evaluation process of evaluation processes 244 based on performance characteristics 252. For instance, evaluation process selector 236 in accordance with an embodiment selects an evaluation process based on comparing one or more respective performance characteristics associated with each evaluation process. As discussed below with respect to FIG. 5, evaluation process selector 236 in accordance with an embodiment evaluates performance characteristics 252 as a multi-armed bandit problem. In accordance with one or more embodiments, evaluation process selector 236 evaluates performance characteristics determined by performance characteristic determiner 234 after each iteration of an execution of an evaluation process by performance characteristic determiner 234.

In step 310, the selected evaluation process is executed with respect to further data to retrieve results that satisfy the selected evaluation process. For example, evaluation processor executor 238 receives selected evaluation process 254 and components 242 from evaluation process selector 236. Evaluation process executor 238 executes selected evaluation process 254 with respect to further data 256 to retrieve results 262. Further data 256 represents the remaining data that sample 246 is associated with. As shown in FIG. 2, evaluation process executor 238 provides a call 258 to regular expression engine 112 of FIG. 1 (not shown in FIG. 2). Depending on the configuration of selected evaluation process 254, call 258 includes one or more pattern components of components 242, one or more pattern subcomponents of components 242, and/or the regular expression included in regular expression query 240. Call 258 may also include an indication of a portion of further data 256 that the included components, subcomponents, or regular expression are evaluated with respect to. For instance, call 258 in accordance with an embodiment includes an indication of a subset of lines or a subset of characters in a subset of lines of further data 256 that are to be evaluated using the included components, subcomponents, or regular expression. Regular expression engine 112 evaluates the included components, subcomponents, and/or regular expression with respect to further data 256 (or an indicated portion of further data 256) and provides a response 260. If there is a match, response 260 includes the text that satisfies the components, subcomponents, or expression. Alternatively, response 260 indicates a location of the text in further data 256 (e.g., the position(s) of one or more characters). If there is not a match, response 260 includes an indication that no match was located.

Figure 4:
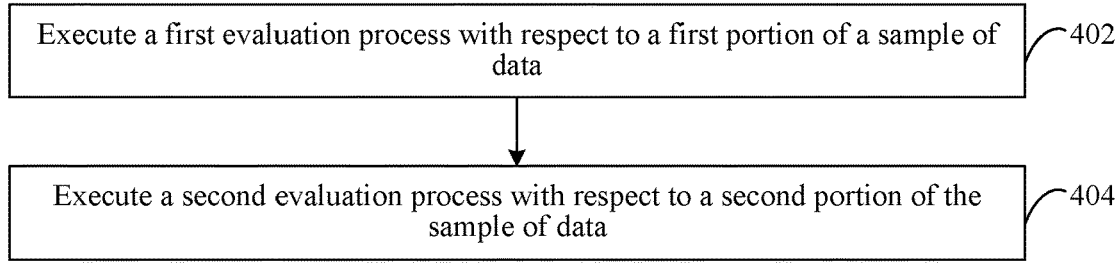
FIG. 4 shows a flowchart of a process for executing a plurality of evaluation processes with respect to a sample of data in accordance with an embodiment.

As discussed above, regular expression framework 208 of FIG. 2 is configured to execute a plurality of evaluation processes with respect to a sample of data. Regular expression framework 208 (or a component thereof) may execute the plurality of evaluation process in various ways, in embodiments. For example, FIG. 4 shows a flowchart of a process for executing a plurality of evaluation processes with respect to a sample of data in accordance with an embodiment. Performance characteristic determiner 234 or evaluation process executor 238 of FIG. 2 may operate according to the steps of flowchart 400, in embodiments. Not all steps of flowchart 400 need be performed in all embodiments. Further structural and operational embodiments will be apparent to persons skilled in the relevant art(s) based on the following description of FIG. 4 with respect to FIG. 2.

Flowchart 400 begins with step 402. In step 402, a first evaluation process is executed with respect to a first portion of a sample of data. For example, performance characteristic determiner 234 (or evaluation process executor 238 on behalf of performance characteristic determiner 234) of FIG. 2 executes a first evaluation process with respect to a first portion of sample 246. As a non-limiting illustrative example, suppose evaluation processes 244 include a first evaluation process that is a 3-way split evaluation process and a second evaluation process that is a direct evaluation process. In this context, performance characteristic determiner 234 executes the 3-way split evaluation process with respect to a first portion of sample 246. In accordance with an embodiment, sample 246 is a sample of a log of logs 120 and the first portion of sample 246 is a line in the log. Alternatively, the first portion of sample 246 includes multiple lines in the log. As described herein, performance characteristic determiner 234 determines performance characteristics of the 3-way split evaluation process based on the execution thereof.

In step 404, a second evaluation process is executed with respect to a second portion of the sample of data. For example, performance characteristic determiner 234 (or evaluation process executor 238 on behalf of performance characteristic determiner 234) of FIG. 2 executes a second evaluation process with respect to a second portion of sample 246. In the non-limiting illustrative example described above with respect to step 402, performance characteristic determiner 234 executes the direct evaluation process with respect to a second portion of sample 246. In accordance with an embodiment, sample 246 is a sample of a log of logs 120 and the second portion of sample 246 is a line in the log. Alternatively, the second portion of sample 246 includes multiple lines in the log. The second portion of sample 246 is (e.g., directly) subsequent to the first portion of sample 246 evaluated in step 402. As described herein, performance characteristic determiner 234 determines performance characteristics of the direct evaluation process based on the execution thereof.

Thus, an example process for executing a plurality of evaluation process has been described with respect to flowchart 400 of FIG. 4. While flowchart 400 describes executing two evaluation processes, it is contemplated herein that embodiments may execute any number of evaluation processes with respect to respective portions of a sample of data. For instance, an example embodiment of performance characteristic determiner 234 (or evaluation process executor 238 on behalf of performance characteristic determiner 234) in accordance with an embodiment executes a direct evaluation process, a 3-way-split evaluation process, and a multi-way-split evaluation process with respect to respective portions of a sample of data. Furthermore, in accordance with an alternative embodiment, performance characteristic determiner 234 executes the plurality of evaluation processes with respect to the same portion of a sample of data.

Figure 5:
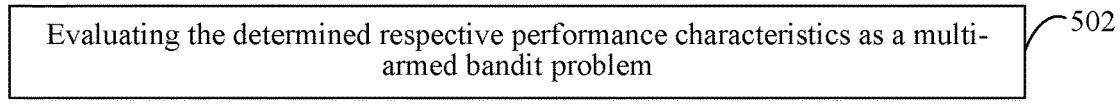
FIG. 5 shows a flowchart of a process for evaluating performance characteristics in accordance with an embodiment.

As discussed above, regular expression framework 208 of FIG. 2 is configured to select an evaluation process of a plurality of evaluation processes based on respective determined performance characteristics. Regular expression framework 208 may select the evaluation process in various ways, in embodiments. For example, FIG. 5 shows a flowchart 500 of a process for evaluating performance characteristics in accordance with an embodiment. Performance characteristic determiner 234 and/or evaluation process selector 236 of FIG. 2 may operate according to the steps of flowchart 500, in embodiments. Not all steps of flowchart 500 need be performed in all embodiments. Further structural and operational embodiments will be apparent to persons skilled in the relevant art(s) based on the following description of FIG. 5 with respect to FIG. 2.

Flowchart 500 includes step 502. In step 502, the determined respective performance characteristics are evaluated as a multi-armed bandit problem. For example, evaluation process selector 236 evaluates performance characteristics 252 as a multi-armed bandit problem. In other words, evaluation process selector 236 attempts to maximize the "reward" (i.e., minimize regret) for selecting an evaluation process. "Reward" in this context may represent fewer resources used, faster execution time, fewer errors in matching, and/or any other improvement to an evaluation process compared to executing another evaluation process with respect to the sample of data (or portion of the sample of data). "Regret" in this context is the inverse of a "reward", in other words, an evaluation process that has a high reward has a low regret, and an evaluation process that has a low reward has a high regret.

In accordance with an embodiment, evaluation process selector 236 evaluates performance characteristics of performance characteristics 252 as they are determined by performance characteristic determiner 234 during a "learning" phase. For instance, performance characteristic determiner 234 executes a first evaluation process with respect to sample 246 and determines performance characteristics of the execution of the first evaluation process. In this context, evaluation process selector 236 evaluates the determined performance characteristics and determines which evaluation process performance characteristic determiner 234 should execute next (e.g., a second evaluation process). After the second evaluation process is executed, evaluation process selector 236 evaluates the determined performance characteristics for the execution of the second evaluation process along with the context of previous executions of evaluation processes (e.g., the previous execution of the first evaluation process). Over time, evaluation process selector 236 improves its selection of evaluation processes and gets closer to choosing an optimal evaluation process (e.g., the evaluation process with minimal regret) for executing with respect to the data. After the learning phase is complete, evaluation process selector 236 selects an evaluation process for executing with respect to further data.

As discussed above, evaluation process selector 236 intends to minimize the "regret" for a selected evaluation process. To minimize regret, evaluation process selector 236 determines a cost for executing an evaluation process with respect to sample 246 (or a portion of sample 246). In accordance with an embodiment, cost is defined by the following equation:

$$SMCost(r, k) = C_{string} + C_{regex} \quad \text{(Equation 1)}$$

In Equation 1, SMCost( ) represents the cost for executing an evaluation process, where r is a regular expression (e.g., the regular expression included in regular expression query 240) and k is the number of literal components the evaluation process is configured to identify in a sample of data. $C_{string}$ represents the cost for matching literal components and $C_{regex}$ represents the cost for matching pattern components.

In accordance with an embodiment, $C_{string}$ is determined according to the following equation:

$$C_{string} = |\ell| + \sum_{i=1}^{k} f \cdot (C_{s1} + C_{s2}) \quad \text{(Equation 2)}$$

In Equation 2, $\ell$ is a log line of sample 246, f is a multiplicative constant that captures the overhead of processing a literal component by a string matching algorithm. Equation 2 is divided into two parts, represented by $C_{s1}$ and $C_{s2}$. $C_{s1}$ represents a first portion of a string matching cost and $C_{s2}$ represents a second portion of the string matching cost. In accordance with an embodiment, $C_{s1}$ is determined according to Equation 3 and $C_{s2}$ is determined according to Equation 4 as follows:

$$C_{s1} = c \cdot (1 - \sigma_i) \cdot \prod_{j=1}^{i-1} \sigma_j \quad \text{(Equation 3)}$$

$$C_{s2} = i \cdot \prod_{j=1}^{i} \sigma_j \cdot lsize \quad \text{(Equation 4)}$$

In Equations 3 and 4, c is the average number of characters matched in a literal component (e.g., a string) that the string matching algorithm is attempting to identify in log line $\ell$, $\sigma_1, \sigma_2, \ldots, \sigma_k$ represent the selectivity of k literal components in a decomposition of r over the input log (sample 246), and $I_{size}$ is the average size of a literal component (e.g., a string) that the string matching algorithm is attempting to identify in log line $\ell$. Note that k is equal to 1 for a 2-way split, k is equal to 2 for a 3-way split, and k is greater than 2 for a multi-way split (e.g., k is equal to 3 for a five-way split that is configured to identify text that matches three literal components and two pattern components).

With continued reference to Equations 2-4, the cost for matching literal components is determined as follows. $C_{s1}$ represents the cost of matching c characters of a literal component in log line $\ell$ on average. For the $i^{th}$ literal component, string matching is performed (e.g., only) if the previous i−1 literal components are matched. In Equation 3, this is accounted for by the product of selectivities of the i−1 literal components. With reference to Equation 4, since i−1 literal components are matched, (i−1)· $I_{size}$ letter matches are performed as well. The $i^{th}$ literal component is also present in log line & with probability $\sigma_i$ and thus contributes an additional lsize character match.

As discussed above SMCost is the sum of $C_{string}$ and $C_{regex}$. In accordance with an embodiment, $C_{regex}$ may be determined according to the following equation:

$$C_{regex} = C_{extract} + C_{engine} \quad \text{(Equation 5)}$$

In Equation 5, $C_{extract}$ represents the cost of extracting a substring from log line $\ell$ and $C_{engine}$ represents the cost for evaluating the pattern components using a regular expression engine. In accordance with an embodiment, $C_{extract}$ is determined according to Equation 6 and $C_{engine}$ is determined according to Equation 7 as follows:

$$C_{extract} = \sum_{i=1}^{k-1} |\ell'_i| \quad \text{(Equation 6)}$$

$$C_{engine} = \theta(r) \cdot \sum_{i=1}^{k-1} |\ell'_i| \cdot \sigma \quad \text{(Equation 7)}$$

In Equations 6 and 7, $\ell'$ represents the substring between the $i^{th}$ and the $(i+1)^{th}$ literal component and $\theta(r)$ represents a constant such that $\theta(r)$ $\ell$ is the cost of executing regular expression r using the regular expression engine.

With continued reference to Equations 5-7, the cost of evaluation pattern components using a regular expression engine is determined as follows. The cost of extracting the substrings for executing on the engine ($C_{extract}$) is set as a sum of the lengths of the substrings.

The above Equations 1-7 have been described with respect to a direct evaluation process, a 2-way split evaluation process, and a 3-way split evaluation process. However, embodiments described herein may execute other evaluation processes. For instance, a "multi-way" evaluation process is an evaluation process with three or more literal components (i.e., k≥ 3).

As discussed above, evaluation process selector 236 intends to minimize the "regret" for a selected evaluation process. In the accordance with an embodiment, regret is defined by the following equation:

$$\text{Regret} = \sum_{r \in W} \left( \text{Cost}(\text{Split-Matcher}(L, s, \text{chosen}(r))) - \text{Cost}(\text{Split-Matcher}(L, s, \text{opt}(r))) \right)^2 \quad \text{(Equation 8)}$$

In Equation 8, Cost( ) is the cost for executing an evaluation process. Cost( ) may be determined in accordance with Equations 1-7, as discussed above, or according to other cost models. Furthermore, in Equation 8, r is a regular expression in a workload W (e.g., the regular expression received in regular expression query 240), L is the sample (or portion of the sample) the evaluation process is executed with respect to, and s is a fixed decomposition of r (e.g., components 242). In this context, chosen(r) represents the evaluation process chosen to be executed by performance characteristic determiner 234 and opt(r) represents an optimal evaluation process for evaluating r with respect to L. After each iteration of performance characteristic determiner 234 executing an evaluation process of evaluation processes 244 with respect to sample 246, evaluation process selector 234 calculates Regret using Equation 8. Evaluation process selector 234 determines which evaluation process performance characteristic determiner 234 should execute next based on the calculated Regret and any previously calculated Regrets for that evaluation process. In accordance with one or more embodiments, evaluation process selector 234 selects an evaluation process of evaluation processes 244 after evaluation processes have been executed with respect to (e.g., the entirety of) sample 246. As a non-limiting example, after performance characteristic determiner 234 has executed an evaluation process of evaluation processes 244 for each line of sample 246, evaluation process selector selects the evaluation process with the lowest average Regret across each of its executions.

In some embodiments, evaluation process selector 234 operates in a manner that balances exploration (e.g., selecting a previously unexecuted evaluation process or an evaluation process that has been executed only a predetermined number of times for a subsequent execution) and exploitation (e.g., selecting the evaluation process with the highest performance characteristics) during the "learning" phase. In accordance with an embodiment, evaluation process selector 234 utilizes Thompson sampling to build experience (i.e., context). In this context, evaluation process selector 234 models the reward for each selection of an evaluation process with a distribution over its possible values informed by the uncertainty in its estimate, as compared to treating the reward as a point estimate. In other words, if one of the evaluation processes has a high reward but has not been executed many times (i.e., uncertainty is high), the distribution is flattened to account for the uncertainty. This technique promotes the exploration of other evaluation processes, rather than choosing the evaluation process with the highest reward (e.g., minimal Regret) all of the time.

In accordance with a further embodiment, evaluation process selector 234 models the rewards of each evaluation process using a beta distribution $B(\alpha, \beta)$. At the beginning of the learning phase, $\alpha = \beta = 1$ which leads to uniform distribution of evaluation processes. After every iteration $\alpha$ or $\beta$ is incremented depending on whether the selected evaluation process has been the evaluation process with the maximum reward so far. In accordance with an embodiment, the learning phase runs for a fixed number of iterations (e.g., proportionate to the size of sample 246). For instance, in a non-limiting example, the learning phase iterates an execution of an evaluation process with respect to a line of sample 246. In this non-limiting example, the number of iterations is equal to the number of lines in sample 246. At the end of the learning phase, evaluation process selector 234 selects the evaluation process with the highest reward as the evaluation process (e.g., "mode") in which evaluation process executor 238 executes with respect to further data 256.

In some embodiments, the cost of executing an evaluation process on a specific line of data (e.g., the data that sample 246 is a sample of) is measured with the actual running time. The measured data may be impacted by noise factors such as other processes running on a server or device executing the regular expression engine or regular expression framework, lag in communication between the regular expression engine and the regular expression framework, system glitches, and/or the like. To reduce the impact of noise factors, evaluation process selector 234 in accordance with an embodiment operates using an ensemble learning method. For example, sample 246 in this embodiment is a randomly selected sample of the data (e.g., a random sample of an input log). Sample 246 is split into multiple sub-samples or "folds". In this context, learner 216 includes multiple performance characteristic determiners and evaluation process selectors that operate in a similar manner to performance characteristic determiner 234 and evaluation process selector 236 of FIG. 2. Each performance characteristic determiner executes evaluation process with respect to a respective fold and determines respective performance characteristics for the evaluation processes as described elsewhere herein. Each evaluation process selector evaluates executions of evaluation processes by a corresponding performance characteristic determiner independently. After the learning phase is complete, each evaluation process selector selects a respective selected evaluation process with the highest reward for a respective fold. Learner 216 selects an evaluation process on the respective selected evaluation processes. For example, suppose sample 246 is split into ten folds. In this example, two evaluation process selectors select a first evaluation process, five evaluation process selectors select a second evaluation process, and three evaluation process selectors select a third evaluation process. Learner 216 (or an overall evaluation process selector component of learner 216, not shown in FIG. 2) selects the second evaluation process as selected evaluation process 254 for evaluating further data 256 based on the selections made by the ten evaluation process selectors. By using an ensemble learning method, learner 216 reduces the impact of noise factors in selecting an optimal evaluation process for execution with respect to further data 256.

III. Example Embodiments of Executing Evaluation Processes

As described herein, embodiments of the present disclosure execute a plurality of evaluation processes with respect to a sample of data. Embodiments determine respective performance characteristics for executions of the plurality of evaluation processes and evaluate the performance characteristics (e.g., as a multi-armed bandit problem) to determine which evaluation process to select and execute with respect to further data. By exploring various evaluation processes for executing with respect to data, embodiments are able to determine an efficient evaluation process for evaluating a regular expression with respect to data, thereby increasing the overall speed of regular expression evaluation.

Evaluation processes determined by evaluation process determiner 232 of FIG. 2 are configured to identify text that matches a regular expression or components of the regular expression. An evaluation process may identify text in various ways. For instance, an evaluation process in accordance with an embodiment is a "direct" evaluation process that identifies (or attempts to identify) text that matches a regular expression by providing the regular expression to regular expression engine 112 of FIG. 1 for evaluation thereof. Other evaluation processes identify text that matches literal and pattern components determined by literal and pattern component determiner 230. For instance, as described above with respect to FIG. 1, evaluation processes configured to identify text that matches one or more literal and one or more pattern components include, but are not limited to, 2-way split evaluation processes, 3-way split evaluation process, and multi-way evaluation processes. Additional details regarding evaluation processes and the execution thereof are described further below, as well as elsewhere herein.

As described above, an evaluation process may be executed by identifying text that matches one or more literal components and one or more pattern components in a regular expression. For example, FIG. 6A shows a flowchart 600A of a process for executing an evaluation process with respect to a sample of data in accordance with an embodiment. Performance characteristic determiner 234 or evaluation process executor 238 of FIG. 2 may operate according to the steps of flowchart 600A, in embodiments. In accordance with an embodiment, flowchart 600A is a further embodiment of step 306 of flowchart 300 of FIG. 3. Not all steps of 600A need be performed in all embodiments. Further structural and operational embodiments will be apparent to persons skilled in the relevant art(s) based on the following description of FIG. 6A with respect to FIG. 2.

Flowchart 600A begins with step 602. In step 602, a first portion of text that matches a first literal component is identified in a sample of data. For example, performance characteristic determiner 234 (or evaluation process executor 238 on behalf of performance characteristic determiner 234) identifies a first portion of text in sample 246 that matches a first literal component of components 242.

As a non-limiting example, suppose regular expression query 240 included RegEx 1 as described above with respect to FIG. 1. RegEx 1 is repeated below as follows for reference:

$$clusterName = [0-9]\{4\} - [a-z]\{8\} \quad \text{RegEx 1}$$

In this context, literal and pattern component determiner 230 determines that RegEx 1 includes a first literal component "clusterName=" and a first pattern component "[0-9]{4}-[a-z]{8}" (e.g., using techniques as described with respect to step 302 of flowchart 300 and/or elsewhere herein). Evaluation process determiner 232 determined an evaluation process of evaluation processes 244 that is configured to identify text that matches the first literal component and the first pattern component (e.g., using techniques described with respect to step 304 of flowchart 300 and/or elsewhere herein). In this context, performance characteristic determiner 234 searches sample 246 for text that matches the first literal component, "clusterName=". For example, suppose sample 246 included the example log line below:

$$loremipsumdolarclusterName = 1234 - abcdefghv - vmsitamet \quad \text{Log Line 1}$$

In this case, performance characteristic determiner 234 executes a 2-way split evaluation process that identifies the portion of text in Log Line 1 that matches "clusterName=". In accordance with an embodiment, performance characteristic 234 uses a string matching algorithm that identifies the portion of text by determining the position of the first character of the literal component in sample 246. For instance, in reference to Log Line 1 above, performance characteristic 234 uses a string matching algorithm that determines the "c" in "clusterName=" is the 16th character in Log Line 1. The string matching algorithm iterates through each character in the literal component to confirm that "clusterName=" occurs in the 16th-27th characters in Log Line 1.

In step 604, a second portion of text subsequent to the first portion of text that matches a first pattern component is identified. For example, performance characteristic determiner 234 (or evaluation process executor 238 on behalf of performance characteristic determiner 234) identifies a second portion of text subsequent to the first portion of text that matches a first pattern component. For instance, in continued reference to the non-limiting example described above with respect to step 602, performance characteristic determiner 234 identifies "1234-abcdefgh" in Log Line 1 that matches first pattern component "[0-9]{4}-[a-z]{8}" of RegEx 1. Performance characteristic determiner 234 provides call 248 to regular expression engine 112 of FIG. 1 that evaluates the first pattern component with respect to Log Line 1 to identify text that matches the first pattern component. In this context, call 248 includes the first pattern component and Log Line 1, a portion of Log Line 1 (e.g., the characters following the text that matches the first literal component), or an indication of a portion of Log Line 1.

Example embodiments of FIG. 6A have been described above with respect to identifying portions of text in a sample of data. In some embodiments, performance characteristic determiner 234 or evaluation process executor 238 of FIG. 2 search the entirety of sample 246 to identify portions of text. Alternatively, a subset of sample 246 is searched at a time. For instance, in accordance with an embodiment, sample 246 comprises multiple lines of a log. In this context, performance characteristic determiner 234 performs step 602 and 604 with respect to a subset of sample 246 (e.g., a line of the log, or some lines of the log).

As discussed above, evaluation processes may be configured in various ways, in embodiments. For example, an evaluation process in accordance with an embodiment is configured to identify text that matches a first literal component, a second literal component, and a first pattern component. For instance, FIG. 6B shows a flowchart 600B of a process for executing an evaluation process with respect to a sample of data in accordance with an embodiment. Literal and pattern component determiner 230 and performance characteristic determiner 234 or evaluation process executor 238 of FIG. 2 may operate according to the steps of flowchart 600B, in embodiments. Not all steps of 600B need be performed in all embodiments. Further structural and operational embodiments will be apparent to persons skilled in the relevant art(s) based on the following description of FIG. 6B with respect to FIG. 2.

Flowchart 600B begins with step 612. In accordance with an embodiment, step 612 is a further embodiment of step 302 of flowchart 300, as described above with respect to FIG. 3. In step 612, a second literal component is determined in a regular expression. For example, literal and pattern component determiner 230 of FIG. 2 determines a second literal component in the regular expression included in regular expression query 240.

As a non-limiting example, suppose regular expression query 240 included the following regular expression:

$$clusterName = [0-9]\{4\} - [a-z]\{8\} - vm \qquad \text{RegEx 2}$$

In this context, literal and pattern component determiner 230 determines that RegEx 2 includes a first literal component "clusterName=", a first pattern component "[0-9] {4}-[a-z] {8}", and a second literal component "-vm" (e.g., using techniques as described with respect to step 302 of flowchart 300 and/or elsewhere herein).

As shown in FIG. 6B, flowchart 600B continues to steps 304 of flowchart 304 and step 602 of FIG. 6A. In this context, step 304 includes determining an evaluation process (e.g., the first evaluation process or another evaluation process of evaluation processes 244) that is configured to identify text that matches the first literal component, the second literal component, and the first pattern component. Furthermore, performance characteristic determiner 234 performs step 602 as part of executing the determined evaluation process and flowchart 600B. If performance characteristic determiner 234 identifies text that matches the first literal component, flowchart 600B continues to step 614. Otherwise, no match is determined. For instance, continuing the non-limiting example described above with respect to step 612 and further with respect to Log Line 1, performance characteristic determiner 234 searches sample 246 for text that matches the first literal component of RegEx 2, "clusterName=", in a similar manner described with respect to step 602 of flowchart 600A.

Step 614 is a further embodiment of step 306 of flowchart 300. In step 614, a third portion of text subsequent to the second portion of text that matches the second literal component is identified. For example, performance characteristic determiner 234 (or evaluation process executor 238 on behalf of performance characteristic determiner 234) of FIG. 2 identifies a third portion of text subsequent to the second portion of text that matches the second literal component. If performance characteristic determiner 234 identifies text that matches the second literal component, flowchart 600B continues to step 604, as shown in FIG. 6B. Otherwise, no match is determined. For instance, continuing the non-limiting example described above with respect to step 612 and Log Line 1, performance characteristic determiner 234 searches Log Line 1 for text that matches the second literal component of RegEx 2, "-vm". For instance, performance characteristic determiner 234 uses a string matching algorithm that determines the "-" in "-vm" is the $41^{st}$ character in Log Line 1. The string matching algorithm iterates through each character in the literal component to confirm that "-vm" occurs in the $41^{st}$-$43^{rd}$ characters in Log Line 1.

As shown in FIG. 6B, flowchart 600B continues to step 604 of FIG. 6B. Continuing the non-limiting example described above with respect to steps 612 and 614, subsequent to identifying the first portion of text that matches "clusterName=" and the third portion of text that matches "-vm", performance characteristic determiner 234 searches sample 246 for text that matches the first pattern component of RegEx 2, "[0-9]{4}-[a-z]{8}", in a similar manner described above with respect to step 604 of flowchart 600A.

By identifying the first and third portions of text in sample 246 prior to matching the second portion of text, performance characteristic determiner 234 determines text matching the literal components of RegEx 2 are present in sample 246 prior to determining text matching the pattern components of RegEx 2 are present in sample 246. In other words, regular expression framework 208 provides a call to a regular expression for identifying text that matches a pattern component (or multiple pattern components and/or subcomponents) subsequent to verifying the data (e.g., sample 246, a portion of sample 246, further data 256, a portion of further data 256, etc.) includes text that matches the literal components (e.g., by using a string matching algorithm). In other words, if regular expression framework 208 (or a component thereof) determines that the data does not include text that matches a literal component that satisfies an evaluation process, the regular expression framework 208 determines there is not a match without transmitting a call to the regular expression engine, thereby reducing resources used to retrieve results that satisfy regular expression query 240.

As discussed above, evaluation processes may be configured in various ways, in embodiments. For example, an evaluation process in accordance with an embodiment is configured to identify text that matches a pattern component that is decomposed into a first pattern subcomponent, a literal component, and a second pattern literal component. For instance, FIG. 6C shows a flowchart 600C of a process for executing an evaluation process with respect to a sample of data in accordance with an embodiment. Literal and pattern component determiner 230 and performance characteristic determiner 234 or evaluation process executor 238 of FIG. 2 may operate according to the steps of flowchart 600C, in embodiments. Not all steps of 600C need be performed in all embodiments. Further structural and operational embodiments will be apparent to persons skilled in the relevant art(s) based on the following description of FIG. 6C with respect to FIG. 2.

Flowchart 600C begins with step 622. In accordance with an embodiment, step 612 is a further embodiment of step 302 of flowchart 300, as described above with respect to FIG. 3. In step 622, a first pattern component is decomposed into a first pattern subcomponent, a second literal component, and a second pattern subcomponent. For example, literal and pattern component determiner 230 decomposes the first pattern subcomponent determined in step 302 of flowchart 300 into a first pattern subcomponent, a second literal component, and a second pattern component. As a non-limiting example, suppose regular expression query 240 included RegEx 1, as described above. In this context, literal and pattern component determiner 230 decomposes first pattern component "[0-9]{4}-[a-z]{8}" into a first pattern subcomponent "[0-9]{4}", a second literal component "-", and a second pattern subcomponent "[a-z]{8}".

As shown in FIG. 6C, flowchart 600C continues to step 304 of flowchart 304 of FIG. 3 and step 602 of FIG. 6A. In this context, step 304 includes determining an evaluation process (e.g., the first evaluation process or another evaluation process of evaluation processes 244) that is configured to identify text that matches the first literal component and the first pattern component, wherein identifying text that matches the first pattern component includes identifying text that matches the second literal component, the first pattern subcomponent, and the second pattern subcomponent. Furthermore, performance characteristic determiner 234 performs step 602 as part of executing the determined evaluation process and flowchart 600C. If performance characteristic determiner 234 identifies text that matches the first literal component, flowchart 600C continues to step 624. Otherwise, no match is determined. For instance, continuing the non-limiting example described above with respect to step 622 and further with respect to Log Line 1, performance characteristic determiner 234 searches sample 246 for text that matches the first literal component of RegEx 1, "clusterName=", in a similar manner described with respect to step 602 of flowchart 600A.

Step 624 is a further embodiment of step 604 of flowchart 600A, as described above with respect to FIG. 6A. In step 624, a second portion of text subsequent to a first portion of text is identified, the second portion of text comprises a first sub-portion that matches the first pattern subcomponent, a second sub-portion that matches the second literal component, and a third sub-portion that matches the second pattern subcomponent. For example, performance characteristic determiner 234 (or evaluation process executor 238 on behalf of performance characteristic determiner 234) of FIG. 2 identifies the second portion of text by identifying a first sub-portion of text that matches the first pattern subcomponent, a second sub-portion that matches the second literal component, and a third sub-portion that matches the second pattern component.

In accordance with one or more embodiments, performance characteristic determiner 234 identifies portions of text that match literal components prior to identifying portions of text that match pattern subcomponents. For instance, performance characteristic determiner 234 in accordance with an embodiment searches the data (e.g., sample 246, a portion of sample 246, further data 256, a portion of further data 256) to identify a first portion of text that matches the first literal component (as described above with respect to step 602) and a first sub-portion of the second portion of text that matches the second literal component. If text is identified that matches the literal components, performance characteristic determiner 234 proceeds to attempt to identify text that matches the one or more pattern components (or subcomponents), as described elsewhere herein.

For instance, continuing the non-limiting example described above with respect to step 622 and Log Line 1, performance characteristic determiner 234 searches Log Line 1 for text that matches the second literal component of RegEx 1, "–", (e.g., using a string matching algorithm). In this context, performance characteristic determiner 234 determines the "–" in the second literal component is the $32^{nd}$ character in Log Line 1. Subsequent to identifying the text that matches the first and second literal components, performance characteristic determiner 234 provides a call to regular expression engine 112 to identify text in Log Line 1 that matches the first pattern subcomponent "[0-9]{4}" and that matches the second pattern subcomponent "[a-z]{8}". In accordance with an embodiment, a single call is transmitted to regular expression engine 112 to identify text in Log Line 1 that matches the first and second pattern subcomponents. Alternatively, a separate call is transmitted to regular expression engine 112 to identify text that matches a respective pattern subcomponent. Furthermore, the call may specify the text in Log Line 1 to be evaluated. For instance, a call to identify text that matches the first pattern component specifies that regular expression engine 112 is to evaluate the first pattern component with respect to the $28^{th}$-$31^{st}$ characters in Log Line 1 and a call to identify text that matches the second pattern component specifies that regular expression engine 112 is to evaluate the second pattern component with respect to the $33^{rd}$-$40^{th}$ characters in Log Line 1.

Thus, several example embodiments have been described for determining literal and pattern components (and/or decomposing pattern components into subcomponents) in a regular expression and executing evaluation processes to identify text in a sample of data that matches the identified components. It is also contemplated herein that an evaluation process may be configured to identify components as described with respect to more than one of flowcharts 600A-600C. For instance, a "5-way-split" evaluation process is determined based on components determined in RegEx 2. The 5-way split evaluation process is configured to identify a first portion of text that matches a first literal component "clusterName=", a second portion of text subsequent to the first portion that matches a first pattern component "[0-9]{4}", a third portion of text subsequent to the second portion of text that matches a second literal component "–", a fourth portion of text subsequent to the third portion that matches a second pattern subcomponent "[a-z]{8}", and a fifth portion of text subsequent to the fourth portion of text that matches a third literal component "–vm". In this context, performance characteristic determiner 234 (or evaluation process executor 238 on behalf of performance characteristic determiner 234) identifies the first, third, and fifth portions of text in the data that match the first, second, and third literal components prior to identifying the second and fourth portions of text that match the first and second pattern components. Thus, embodiments described herein conserve compute resources by verifying literal components are matched in the data prior to providing pattern components to a regular expression engine for evaluation thereof.

As discussed above, evaluation processes may be configured in various ways, in embodiments. For example, an evaluation process in accordance with an embodiment is a "direct" evaluation process that is configured to provide a regular expression to a regular expression engine for evaluation thereof. For instance, FIG. 6D shows a flowchart 600D of a process for executing an evaluation process with respect to a sample of data in accordance with an embodiment. Performance characteristic determiner 234 or evaluation process executor 238 of FIG. 2 may operate according to the steps of flowchart 600D, in embodiments. Not all steps of 600D need be performed in all embodiments. Further structural and operational embodiments will be apparent to persons skilled in the relevant art(s) based on the following description of FIG. 6D with respect to FIG. 2.

Flowchart 600D includes step 632. In step 632, a regular expression is provided to a regular expression engine for execution thereof. For example, performance characteristic determiner 234 (or evaluation process executor 238 on behalf of performance characteristic determiner 234) of FIG. 2 provides a call 248 to regular expression engine 112 of FIG. 1. Call 248 in this context includes the regular expression included in regular expression query 240. In accordance with an embodiment, call 248 includes sample 246. Alternatively, call 248 includes a subset of sample 246 (e.g., a line or multiple lines of sample 246). In accordance with an embodiment, call 248 specifies a portion of sample 246 for regular expression engine 112 to evaluate using the regular expression.

Thus, several types of evaluation processes have been described with respect to FIGS. 6A-6D. As described herein, split-matcher 118 or a component of split-matcher 118 (e.g., evaluation process executor 238 of FIG. 2) is configured to execute a selected evaluation process with respect to data. Split-matcher 118 in accordance with one or more embodiments operates according to an evaluation algorithm. Such evaluation algorithms enable split-matcher 118 to operate in various "modes" based on the evaluation process selected by learner 116. For example, split-matcher 118 in accordance with an embodiment executes an evaluation process according to Evaluation Algorithm shown herein below:

literal components (e.g., string literals) used in the evaluation process. The parameterized-split match procedure is described further below.

In lines 7 and 8 of Evaluation Algorithm, if mode is "multi-way-split", line 1 of log L is evaluated using a multi-way split evaluation process. As shown in Evaluation Algorithm, the multi-way split evaluation process invokes the parameterized-split match with k equal to the number of literal components used in the evaluation process.

The parameterized-split match procedure is described as follows with respect to lines 9-22 of Evaluation Algorithm. For illustrative purposes, lines 9-22 of Evaluation Algorithm are described below with respect to a 3-way split evaluation

```
Evaluation Algorithm

Input: Log L, 3-way split of r, multi-way split of r, mode ∈ {direct, 3-way-
       split, multi-way-split}
1      foreach l ∈ L do
2      |    if mode = direct then
3      |    |    execute r on l on the engine
4      |    |    return
5      |    if mode = 3-way-split then
6      |    |    parameterized-split-match(k = 2)
7      |    if mode = multi-way-split then
8      |    |    parameterized-split-match(k = # of string literals in multi-
       |    |    way split)
9      procedure parameterized-split match(k)
            /* str_i is i^th string literal in the split */
10     |    c_list ← empty array , i ← 0, c_-1 ← -1
11     |    pos_j ← 0, j ∈ [k]
12     |    do
13     |    |    while i < k do
14     |    |    |    if c_i ← l.find(str_i, pos_j = c_{i-1}+1) then
15     |    |    |    |    c_list[i] ← c_i, i ← i + 1
16     |    |    |    else
17     |    |    |    |    if i = 0 then return
18     |    |    |    |    i ← i - 1
19     |    |    foreach c_j ∈ c_list do
20     |    |    |    match s_j(l.substr(c_j +
       |    |    |    len(str_j), c_{j+1})) using the engine
       |    |    |    /* s_j is j^th regex component in split of r */
21     |    |    if not matched i ← j + 1, break
22     |    while Input not exhausted
```

Evaluation Algorithm is described with continued reference to system 100 of FIG. 1, regular expression framework 208 of FIG. 2, and flowchart 300 of FIG. 3. For Evaluation Algorithm, Log L is a log of logs 120 (e.g., corresponding to sample 246 and further data 256) including one or more lines, where/is a particular line of data in log L. r is a regular expression included in a regular expression query (e.g., regular expression query 240). As shown in Evaluation Algorithm, a "mode" input is used to determine which evaluation process is used to evaluate lines of L. In this example embodiment, three evaluation processes are described ("direct," "3-way-split," and "multi-way-split").

In lines 2-4 of Evaluation Algorithm, if mode is "direct", line l of log L is evaluated using a direct evaluation process. In particular, regular expression r and line l are provided to regular expression engine 112 for evaluation thereof (line 3 of Evaluation Algorithm) and the results are returned to split-matcher 118 (line 4 of Evaluation Algorithm).

In lines 5 and 6 of Evaluation Algorithm, if mode is "3-way-split", line l of log L is evaluated using a 3-way split evaluation process. As shown in Evaluation Algorithm, the 3-way split evaluation process invokes a procedure "parameterized-split match" with k=2, where k is the number of process where k=2 and further with respect to RegEx 2 and Log Line 1. RegEx 2 and Log Line 1 are repeated as follows for reference:

$$clusterName = [0-9]\{4\} - [a-z]\{8\} - vm \qquad \text{RegEx 2}$$

$$loremipsumdolarclusterName = 1234 - abcdefghv - vmsitamet \quad \text{Log Line 1}$$

In this illustrative example, the 3-way split evaluation process is configured to identify text that matches a first literal component "clusterName=", a first pattern component "[0-9]{4}-[a-z] {8}", and a second literal component "−vm". In Evaluation Algorithm, $str_i$ is the $i^{th}$ string literal in the evaluation process. For this example, $str_0$ is "clusterName=" and $str_1$ is "−vm".

The parameterized-split match procedure of Evaluation Algorithm begins by creating an empty array $C_{list}$, a variable i with an initial value of 0, and a variable $c_{-1}$ with an initial value of −1 (line 10) and creating a variable $pos_j$ with an initial value 0, where j are elements in k, (line 11).

Lines 12-22 of Evaluation Algorithm are a do while loop that is repeated so long as input (e.g., the log line l) is not exhausted (line 22). The loop includes a while loop that repeats as long as i is lower than k (lines 13-18) where Evaluation Algorithm identifies text that matches each of the literal components (e.g., $str_0$ and $str_1$) and a for each loop that identifies text that matches each of the pattern components (lines 19-21).

Referring to the while loop of lines 13-18 of Evaluation Algorithm, an if statement checks if $str_i$ is found in line l. The find function begins at the character in position $c_{i-1}+1$, which is initially at 0 for i=0. If $str_i$ is found, its position is stored as variable $c_i$. The variable $c_i$ is then stored in the $i^{th}$ position in array $C_{list}$ and the variable i is incremented by 1 (line 15). The while loop is then repeated to check if the next literal component (e.g., $str_i$ when i=1) is found in log line l. For instance, with reference to RegEx 2 and Log Line 1, the find function finds $str_0$ in characters 16-27 of Log Line 1, assigns $c_0$ a value of 15 (i.e., a value of 0 represents the $1^{st}$ character in Log Line 1, therefore a value of 15 represents the $16^{th}$ character), and stores $c_0$ as a first value in the array $C_{list}$. i is incremented by 1 (i=1) and the while loop repeats for $str_1$. The find function finds $str_1$ in characters 41-43 of Log Line 1, assigns $c_1$ a value of 40, and stores $c_1$ as a second value in the array $C_{list}$. i is incremented by 1 (i=2) and the while loop ends.

If $str_i$ is not found an else statement is evaluated (lines 16-18). In this context, not all of the literal components were found in log line l and therefore, there is no need to provide a call to the regular expression engine for locating the pattern components.

If the while loop of lines 13-18 of Evaluation Algorithm is able to find the positions of each literal component, the algorithm proceeds to the for each loop of lines lines 19-21 of Evaluation Algorithm. In particular, for each value stored in $C_{list}$, a matching operation is performed (line 20). The match is performed by providing a substring portion of line/between the $j^{th}$ value in $C_{list}$ and the next value in $C_{list}$. For instance, continuing the illustrative example described with respect to RegEx 2 and Log Line 1, the matching operation is performed by providing a substring of Log Line 2 that's between the $27^{th}$ character in Log Line 2 (e.g., the last character of $str_0$) and the $41^{st}$ character in Log Line 2 (e.g., the first character of $str_1$). By specifying a subset of/to identify text that matches the pattern component(s), embodiments of split-matcher 118 reduce the amount of text that regular expression engine is to evaluate, and therefore reduce resource usage to evaluate pattern components of a regular expression and/or decrease the time taken to evaluate pattern components of a regular expression. If a match is not found, the loop is broken (line 21). If a match is found, the match is provided by the regular expression framework, as described elsewhere herein.

Thus, an example algorithm for executing evaluation processes has been described according to Evaluation Algorithm above. Split-matcher 118 of FIG. 1 (or evaluation process executor 238 of FIG. 2) may operate according to Evaluation Algorithm or similar algorithms to execute an evaluation process with respect to data to retrieve results that satisfy the evaluation process (and/or a regular expression query). While Evaluation Algorithm illustrates three modes of operation (direct, 3-way split, and multi-way split), embodiments described herein may operate according to similar evaluation algorithms that include greater or fewer modes of operation (e.g., 2-way splits, 5-way splits, etc.).

Furthermore, performance characteristic determiner 234 may operate according to Evaluation Algorithm or similar algorithms to execute a plurality of evaluation process to determine performance characteristics of the evaluation processes. Alternatively, split-matcher 118 or evaluation process executor 238 may execute the plurality of evaluation processes on behalf of performance characteristic determiner 234, as described herein. For example, performance characteristic determiner 234 (and/or evaluation process selector 236) in accordance with an embodiment determine an evaluation process to execute with respect to a log line l of a sample of data as part of a learning phase. In this context, the mode input of Evaluation Algorithm represents the determined evaluation process. During the learning phase, after each iteration of the Evaluation Algorithm, a new mode input is determined to determine which evaluation process to execute with respect to the next log line in a sample of data.

IV. Example Computing Device Embodiments

As noted herein, the embodiments described, along with any circuits, components and/or subcomponents thereof, as well as the flowcharts/flow diagrams described herein, including portions thereof, and/or other embodiments, may be implemented in hardware, or hardware with any combination of software and/or firmware, including being implemented as computer program code configured to be executed in one or more processors and stored in a computer readable storage medium, or being implemented as hardware logic/ electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 7:
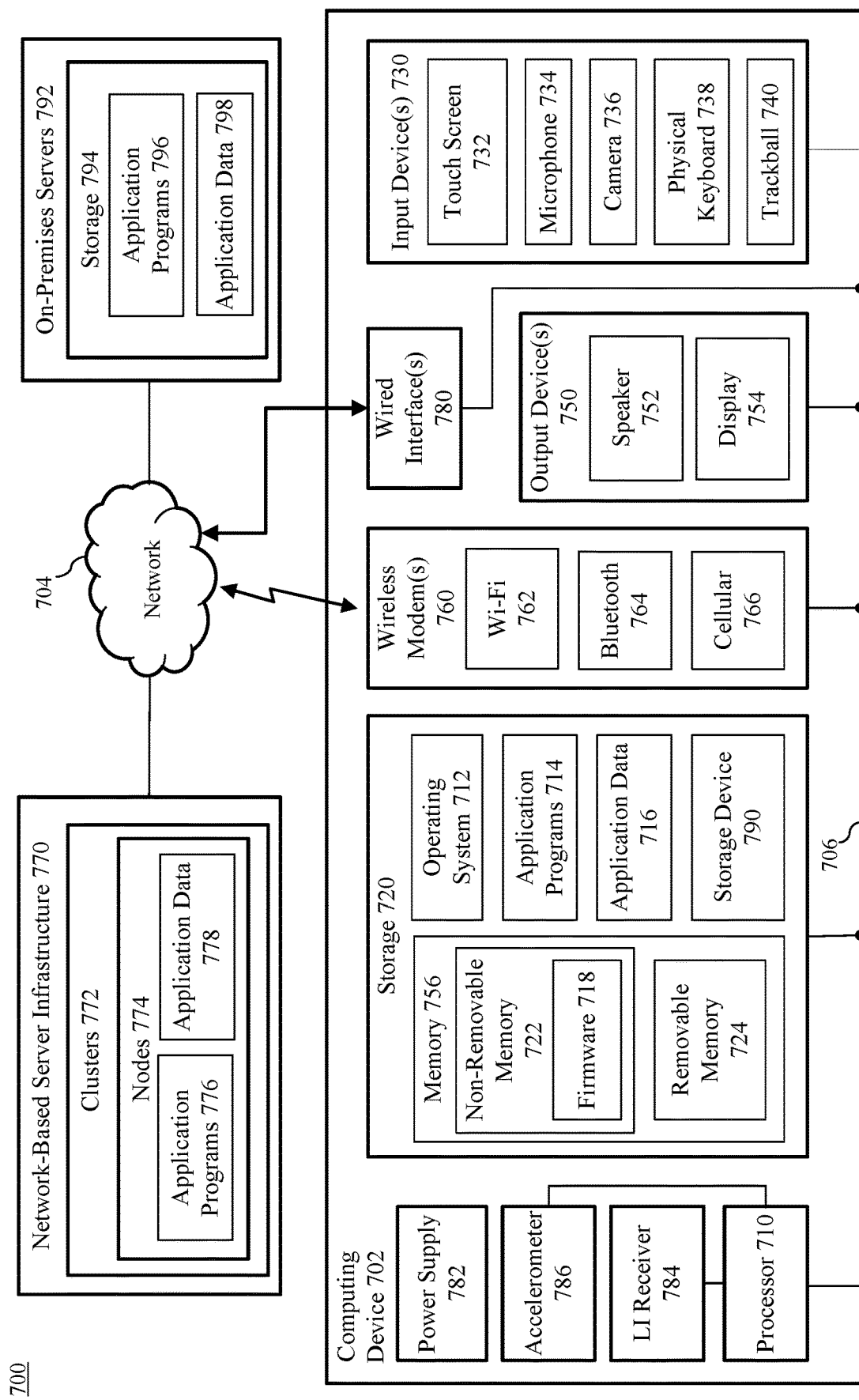
FIG. 7 shows a block diagram of an example computer system in which embodiments may be implemented.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 7. FIG. 7 shows a block diagram of an exemplary computing environment 700 that includes a computing device 702. Computing device 702 is an example of server 102A, server 102N, computing device 104A, and/or computing device 104N, of FIG. 1, each of which may include one or more of the components of computing device 702. In some embodiments, computing device 702 is communicatively coupled with devices (not shown in FIG. 7) external to computing environment 700 via network 704. Network 704 is an example of network 122 of FIG. 1. Network 704 comprises one or more networks such as local area networks (LANs), wide area networks (WANs), enterprise networks, the Internet, etc., and may include one or more wired and/or wireless portions. Network 704 may additionally or alternatively include a cellular network for cellular communications. Computing device 702 is described in detail as follows.

Computing device 702 can be any of a variety of types of computing devices. For example, computing device 702 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Rift® of Facebook Technologies, LLC, etc.), or other type of mobile computing device. Computing device 702 may alternatively be a stationary computing device such as a desktop computer, a personal computer (PC), a stationary server device, a minicomputer, a mainframe, a supercomputer, etc.

As shown in FIG. 7, computing device 702 includes a variety of hardware and software components, including a processor 710, a storage 720, one or more input devices 730, one or more output devices 750, one or more wireless modems 760, one or more wired interfaces 780, a power supply 782, a location information (LI) receiver 784, and an accelerometer 786. Storage 720 includes memory 756, which includes non-removable memory 722 and removable memory 724, and a storage device 790. Storage 720 also stores an operating system 712, application programs 714, and application data 716. Wireless modem(s) 760 include a Wi-Fi modem 762, a Bluetooth modem 764, and a cellular modem 766. Output device(s) 750 includes a speaker 752 and a display 754. Input device(s) 730 includes a touch screen 732, a microphone 734, a camera 736, a physical keyboard 738, and a trackball 740. Not all components of computing device 702 shown in FIG. 7 are present in all embodiments, additional components not shown may be present, and any combination of the components may be present in a particular embodiment. These components of computing device 702 are described as follows.

A single processor 710 (e.g., central processing unit (CPU), microcontroller, a microprocessor, signal processor, ASIC (application specific integrated circuit), and/or other physical hardware processor circuit) or multiple processors 710 may be present in computing device 702 for performing such tasks as program execution, signal coding, data processing, input/output processing, power control, and/or other functions. Processor 710 may be a single-core or multi-core processor, and each processor core may be single-threaded or multithreaded (to provide multiple threads of execution concurrently). Processor 710 is configured to execute program code stored in a computer readable medium, such as program code of operating system 712 and application programs 714 stored in storage 720. Operating system 712 controls the allocation and usage of the components of computing device 702 and provides support for one or more application programs 714 (also referred to as "applications" or "apps"). Application programs 714 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 702 can communicate with any other component according to function, although not all connections are shown for ease of illustration. For instance, as shown in FIG. 7, bus 706 is a multiple signal line communication medium (e.g., conductive traces in silicon, metal traces along a motherboard, wires, etc.) that may be present to communicatively couple processor 710 to various other components of computing device 702, although in other embodiments, an alternative bus, further buses, and/or one or more individual signal lines may be present to communicatively couple components. Bus 706 represents one or more of any of several types of bus structures, including a memory bus or memory controller, a peripheral bus, an accelerated graphics port, and a processor or local bus using any of a variety of bus architectures.

Storage 720 is physical storage that includes one or both of memory 756 and storage device 790, which store operating system 712, application programs 714, and application data 716 according to any distribution. Non-removable memory 722 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 722 may include main memory and may be separate from or fabricated in a same integrated circuit as processor 710. As shown in FIG. 7, non-removable memory 722 stores firmware 718, which may be present to provide low-level control of hardware. Examples of firmware 718 include BIOS (Basic Input/Output System, such as on personal computers) and boot firmware (e.g., on smart phones). Removable memory 724 may be inserted into a receptacle of or otherwise coupled to computing device 702 and can be removed by a user from computing device 702. Removable memory 724 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 790 may be present that are internal and/or external to a housing of computing device 702 and may or may not be removable. Examples of storage device 790 include a hard disk drive, a SSD, a thumb drive (e.g., a USB (Universal Serial Bus) flash drive), or other physical storage device.

One or more programs may be stored in storage 720. Such programs include operating system 712, one or more application programs 714, and other program modules and program data. Examples of such application programs may include, for example, computer program logic (e.g., computer program code/instructions) for implementing one or more of regular expression framework 108, user application 110A, data science application 110N, regular expression engine 112, splitter 114, learner 116, split-matcher 118, regular expression framework 208, splitter 214, learner 216, split-matcher 218, literal and pattern component determiner 230, evaluation process determiner 232, performance characteristic determiner 234, evaluation process selector 236, and/or evaluation process executor 238, along with any components and/or subcomponents thereof, as well as the flowcharts/flow diagrams (e.g., flowcharts 300, 400, 500, 600A, 600B, 600C, and/or 600D) described herein, including portions thereof, and/or further examples described herein.

Storage 720 also stores data used and/or generated by operating system 712 and application programs 714 as application data 716. Examples of application data 716 include web pages, text, images, tables, sound files, video data, and other data, which may also be sent to and/or received from one or more network servers or other devices via one or more wired or wireless networks. Storage 720 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 702 through one or more input devices 730 and may receive information from computing device 702 through one or more output devices 750. Input device(s) 730 may include one or more of touch screen 732, microphone 734, camera 736, physical keyboard 738 and/or trackball 740 and output device(s) 750 may include one or more of speaker 752 and display 754. Each of input device(s) 730 and output device(s) 750 may be integral to computing device 702 (e.g., built into a housing of computing device 702) or external to computing device 702 (e.g., communicatively coupled wired or wirelessly to computing device 702 via wired interface(s) 780 and/or wireless modem(s) 760). Further input devices 730 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 754 may display information, as well as operating as touch screen 732 by receiving user commands and/or other information (e.g., by touch, finger gestures, virtual keyboard, etc.) as a user interface. Any number of each type of input device(s) 730 and output device(s) 750 may be present, including multiple microphones 734, multiple cameras 736, multiple speakers 752, and/or multiple displays 754.

One or more wireless modems 760 can be coupled to antenna(s) (not shown) of computing device 702 and can support two-way communications between processor 710 and devices external to computing device 702 through network 704, as would be understood to persons skilled in the relevant art(s). Wireless modem 760 is shown generically and can include a cellular modem 766 for communicating with one or more cellular networks, such as a GSM network for data and voice communications within a single cellular network, between cellular networks, or between the mobile device and a public switched telephone network (PSTN). Wireless modem 760 may also or alternatively include other radio-based modem types, such as a Bluetooth modem 764 (also referred to as a "Bluetooth device") and/or Wi-Fi 762 modem (also referred to as an "wireless adaptor"). Wi-Fi modem 762 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 764 is configured to communicate with another Bluetooth-capable device according to the Bluetooth short-range wireless technology standard(s) such as IEEE 802.15.1 and/or managed by the Bluetooth Special Interest Group (SIG).

Computing device 702 can further include power supply 782, LI receiver 784, accelerometer 786, and/or one or more wired interfaces 780. Example wired interfaces 780 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 780 of computing device 702 provide for wired connections between computing device 702 and network 704, or between computing device 702 and one or more devices/peripherals when such devices/peripherals are external to computing device 702 (e.g., a pointing device, display 754, speaker 752, camera 736, physical keyboard 738, etc.). Power supply 782 is configured to supply power to each of the components of computing device 702 and may receive power from a battery internal to computing device 702, and/or from a power cord plugged into a power port of computing device 702 (e.g., a USB port, an A/C power port). LI receiver 784 may be used for location determination of computing device 702 and may include a satellite navigation receiver such as a Global Positioning System (GPS) receiver or may include other type of location determiner configured to determine location of computing device 702 based on received information (e.g., using cell tower triangulation, etc.). Accelerometer 786 may be present to determine an orientation of computing device 702.

Note that the illustrated components of computing device 702 are not required or all-inclusive, and fewer or greater numbers of components may be present as would be recognized by one skilled in the art. For example, computing device 702 may also include one or more of a gyroscope, barometer, proximity sensor, ambient light sensor, digital compass, etc. Processor 710 and memory 756 may be co-located in a same semiconductor device package, such as being included together in an integrated circuit chip, FPGA, or system-on-chip (SOC), optionally along with further components of computing device 702.

In embodiments, computing device 702 is configured to implement any of the above-described features of flowcharts herein. Computer program logic for performing any of the operations, steps, and/or functions described herein may be stored in storage 720 and executed by processor 710.

In some embodiments, server infrastructure 770 may be present in computing environment 700 and may be communicatively coupled with computing device 702 via network 704. Server infrastructure 770, when present, may be a network-accessible server set (e.g., a cloud-based environment or platform). As shown in FIG. 7, server infrastructure 770 includes clusters 772. Each of clusters 772 may comprise a group of one or more compute nodes and/or a group of one or more storage nodes. For example, as shown in FIG. 7, cluster 772 includes nodes 774. Each of nodes 774 are accessible via network 704 (e.g., in a "cloud-based" embodiment) to build, deploy, and manage applications and services. Any of nodes 774 may be a storage node that comprises a plurality of physical storage disks, SSDs, and/or other physical storage devices that are accessible via network 704 and are configured to store data associated with the applications and services managed by nodes 774. For example, as shown in FIG. 7, nodes 774 may store application data 778.

Each of nodes 774 may, as a compute node, comprise one or more server computers, server systems, and/or computing devices. For instance, a node 774 may include one or more of the components of computing device 702 disclosed herein. Each of nodes 774 may be configured to execute one or more software applications (or "applications") and/or services and/or manage hardware resources (e.g., processors, memory, etc.), which may be utilized by users (e.g., customers) of the network-accessible server set. For example, as shown in FIG. 7, nodes 774 may operate application programs 776. In an implementation, a node of nodes 774 may operate or comprise one or more virtual machines, with each virtual machine emulating a system architecture (e.g., an operating system), in an isolated manner, upon which applications such as application programs 776 may be executed.

In an embodiment, one or more of clusters 772 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 772 may be a datacenter in a distributed collection of datacenters. In embodiments, exemplary computing environment 700 comprises part of a cloud-based platform such as Amazon Web Services® of Amazon Web Services, Inc. or Google Cloud Platform™ of Google LLC, although these are only examples and are not intended to be limiting.

In an embodiment, computing device 702 may access application programs 776 for execution in any manner, such as by a client application and/or a browser at computing device 702. Example browsers include Microsoft Edge® by Microsoft Corp. of Redmond, Washington, Mozilla Firefox®, by Mozilla Corp. of Mountain View, California, Safari®, by Apple Inc. of Cupertino, California, and Google® Chrome by Google LLC of Mountain View, California.

For purposes of network (e.g., cloud) backup and data security, computing device 702 may additionally and/or alternatively synchronize copies of application programs 714 and/or application data 716 to be stored at network-based server infrastructure 770 as application programs 776 and/or application data 778. For instance, operating system 712 and/or application programs 714 may include a file hosting service client, such as Microsoft® OneDrive® by Microsoft Corporation, Amazon Simple Storage Service (Amazon S3)® by Amazon Web Services, Inc., Dropbox® by Dropbox, Inc., Google Drive™ by Google LLC, etc., configured to synchronize applications and/or data stored in storage 720 at network-based server infrastructure 770.

In some embodiments, on-premises servers 792 may be present in computing environment 700 and may be communicatively coupled with computing device 702 via network 704. On-premises servers 792, when present, are hosted within an organization's infrastructure and, in many cases, physically onsite of a facility of that organization. On-premises servers 792 are controlled, administered, and maintained by IT (Information Technology) personnel of the organization or an IT partner to the organization. Application data 798 may be shared by on-premises servers 792 between computing devices of the organization, including computing device 702 (when part of an organization) through a local network of the organization, and/or through further networks accessible to the organization (including the Internet). Furthermore, on-premises servers 792 may serve applications such as application programs 796 to the computing devices of the organization, including computing device 702. Accordingly, on-premises servers 792 may include storage 794 (which includes one or more physical storage devices such as storage disks and/or SSDs) for storage of application programs 796 and application data 798 and may include one or more processors for execution of application programs 796. Still further, computing device 702 may be configured to synchronize copies of application programs 714 and/or application data 716 for backup storage at on-premises servers 792 as application programs 796 and/or application data 798.

Embodiments described herein may be implemented in one or more of computing device 702, network-based server infrastructure 770, and on-premises servers 792. For example, in some embodiments, computing device 702 may be used to implement systems, clients, or devices, or components/subcomponents thereof, disclosed elsewhere herein. In other embodiments, a combination of computing device 702, network-based server infrastructure 770, and/or on-premises servers 792 may be used to implement the systems, clients, or devices, or components/subcomponents thereof, disclosed elsewhere herein.

As used herein, the terms "computer program medium," "computer-readable medium," and "computer-readable storage medium," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 720. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 714) may be stored in storage 720. Such computer programs may also be received via wired interface(s) 780 and/or wireless modem(s) 760 over network 704. Such computer programs, when executed or loaded by an application, enable computing device 702 to implement features of embodiments discussed herein. Accordingly, such computer programs represent controllers of the computing device 702.

Embodiments are also directed to computer program products comprising computer code or instructions stored on any computer-readable medium or computer-readable storage medium. Such computer program products include the physical storage of storage 720 as well as further physical storage types.

VI. Additional Example Embodiments

A system is described herein. The system includes a processor circuit and a memory. The memory stores program code that, when executed by the processor circuit, performs operations. The operations comprise: determining a first literal component and a first pattern component in a regular expression; determining a plurality of evaluation processes based on the regular expression, the plurality of evaluation processes including a first evaluation process configured to identify text that matches the first literal component and the first pattern component; executing the plurality of evaluation processes with respect to a sample of data to determine performance characteristics including a determined performance characteristic respective to each evaluation process of the plurality of evaluation processes; selecting an evaluation process of the plurality of evaluation processes based on the determined performance characteristics; and executing the selected evaluation process with respect to further data to retrieve results that satisfy the selected evaluation process.

In one implementation of the foregoing system, said executing the plurality of evaluation processes with respect to the sample of data comprises: executing the first evaluation process. Executing the first evaluation process comprising identifying a first portion of text in the sample of data that matches the first literal component, and identifying a second portion of text subsequent to the first portion of text that matches the first pattern component.

In one implementation of the foregoing system, the operations further comprise determining a second literal component in the regular expression. Said executing the first evaluation process further comprises identifying a third portion of text subsequent to the second portion of text that matches the second literal component.

In one implementation of the foregoing system, the operations further comprise decomposing the first pattern component into a first pattern subcomponent, a second literal component, and a second pattern subcomponent.

In one implementation of the foregoing system, said executing the plurality of evaluation processes with respect to a sample of data comprises: executing the first evaluation process with respect to a first portion of the sample of data; and executing a second evaluation process with respect to a second portion of the sample of data.

In one implementation of the foregoing system, said executing the plurality of evaluation processes with respect to a sample of data comprises: executing a second evaluation process that specifies a process to provide the regular expression to a regular expression engine for execution thereof.

In one implementation of the foregoing system, said selecting an evaluation process comprises: evaluating the determined respective performance characteristics as a multi-armed bandit problem.

A method is described herein. The method comprises: determining a first literal component and a first pattern component in a regular expression; determining a plurality of evaluation processes based on the regular expression, the plurality of evaluation processes including a first evaluation process configured to identify text that matches the first literal component and the first pattern component; executing the plurality of evaluation processes with respect to a sample of data to determine performance characteristics including a determined performance characteristic respective to each evaluation process of the plurality of evaluation processes; selecting an evaluation process of the plurality of evaluation processes based on the determined performance characteristics; and executing the selected evaluation process with respect to further data to retrieve results that satisfy the selected evaluation process.

In one implementation of the foregoing method, said executing the plurality of evaluation processes with respect to the sample of data comprises: executing the first evaluation process. Executing the first evaluation process comprises: identifying a first portion of text in the sample of data that matches the first literal component; and identifying a second portion of text subsequent to the first portion of text that matches the first pattern component.

In one implementation of the foregoing method, the method further comprises determining a second literal component in the regular expression. Said executing the first evaluation process further comprises: identifying a third portion of text subsequent to the second portion of text that matches the second literal component.

In one implementation of the foregoing method, the method further comprises decomposing the first pattern component into a first pattern subcomponent, a second literal component, and a second pattern subcomponent.

In one implementation of the foregoing method, said executing the plurality of evaluation processes with respect to a sample of data comprises: executing the first evaluation process with respect to a first portion of the sample of data; and executing a second evaluation process with respect to a second portion of the sample of data.

In one implementation of the foregoing method, said executing the plurality of evaluation processes with respect to a sample of data comprises: executing a second evaluation process that specifies a process to provide the regular expression to a regular expression engine for execution thereof.

In one implementation of the foregoing method, said selecting an evaluation process comprises: evaluating the determined respective performance characteristics as a multi-armed bandit problem.

A computer-readable storage medium is described herein. The computer-readable storage medium has computer program logic recorded thereon that when executed by a processor circuit causes the processor circuit to perform a method. The method comprises: determining a first literal component and a first pattern component in a regular expression; determining a plurality of evaluation processes based on the regular expression, the plurality of evaluation processes including a first evaluation process configured to identify text that matches the first literal component and the first pattern component; executing the plurality of evaluation processes with respect to a sample of data to determine performance characteristics including a determined performance characteristic respective to each evaluation process of the plurality of evaluation processes; selecting an evaluation process of the plurality of evaluation processes based on the determined performance characteristics; and executing the selected evaluation process with respect to further data to retrieve results that satisfy the selected evaluation process.

In one implementation of the foregoing computer-readable storage medium, said executing the plurality of evaluation processes with respect to the sample of data comprises executing the first evaluation process. Executing the first evaluation process comprises: identifying a first portion of text in the sample of data that matches the first literal component; and identifying a second portion of text subsequent to the first portion of text that matches the first pattern component.

In one implementation of the foregoing computer-readable storage medium, the method further comprises determining a second literal component in the regular expression. Said executing the first evaluation process further comprises identifying a third portion of text subsequent to the second portion of text that matches the second literal component.

In one implementation of the foregoing computer-readable storage medium, the method further comprises: decomposing the first pattern component into a first pattern subcomponent, a second literal component, and a second pattern subcomponent.

In one implementation of the foregoing computer-readable storage medium, said executing the plurality of evaluation processes with respect to a sample of data comprises: executing the first evaluation process with respect to a first portion of the sample of data; and executing a second evaluation process with respect to a second portion of the sample of data.

In one implementation of the foregoing computer-readable storage medium, said executing the plurality of evaluation processes with respect to a sample of data comprises: executing a second evaluation process that specifies a process to provide the regular expression to a regular expression engine for execution thereof.

In one implementation of the foregoing computer-readable storage medium, said selecting an evaluation process comprises evaluating the determined respective performance characteristics as a multi-armed bandit problem.

V. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives modifying a condition or relationship characteristic of a feature or features of an implementation of the disclosure, should be understood to mean that the condition or characteristic is defined to within tolerances that are acceptable for operation of the implementation for an application for which it is intended. Furthermore, if the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors. Still further, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

Numerous example embodiments have been described above. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Furthermore, example embodiments have been described above with respect to one or more running examples. Such running examples describe one or more particular implementations of the example embodiments; however, embodiments described herein are not limited to these particular implementations.

Moreover, according to the described embodiments and techniques, any components of systems, computing devices, servers, regular expression frameworks, regular expression engines, applications, and/or data stores and their functions may be caused to be activated for operation/performance thereof based on other operations, functions, actions, and/or the like, including initialization, completion, and/or performance of the operations, functions, actions, and/or the like.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (or completely) concurrently with each other or with other operations.

The embodiments described herein and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described example embodiments, but should be defined only in accordance with the following claims and their equivalents.

What is claimed is:

1. A system, comprising:
a processor circuit; and
a memory that stores program code that, when executed by the processor circuit, performs operations, the operations comprising:
  determining a first literal component in a regular expression;
  determining a second literal component subsequent to the first literal component in the regular expression;
  determining a first pattern component subsequent to the first literal component and prior to the second literal component in the regular expression;
  determining a plurality of evaluation processes based on the regular expression, the plurality of evaluation processes comprising a first evaluation process configured to identify text that matches the first literal component, the first pattern component, and the second literal component;
  executing the plurality of evaluation processes with respect to a sample of data to determine performance characteristics including a determined performance characteristic respective to each evaluation process of the plurality of evaluation processes, said executing the plurality of evaluation processes comprising executing the first evaluation process by:
    identifying, without utilizing a regular expression engine, a first portion of text in the sample of data that matches the first literal component,
    identifying, without utilizing the regular expression engine, a second portion of text in the sample of data subsequent to the first portion of text that matches the second literal component, and
    utilizing the regular expression engine to identify a third portion of text in the sample of data subsequent to the first portion of text and prior to the second portion of text that matches the first pattern component;
  selecting an evaluation process of the plurality of evaluation processes based on the determined performance characteristics; and
  executing the selected evaluation process with respect to further data to retrieve results that satisfy the selected evaluation process.

2. The system of claim 1, wherein the operations further comprise:
    decomposing the first pattern component into a first pattern subcomponent, a third literal component, and a second pattern subcomponent.

3. The system of claim 1, wherein said executing the plurality of evaluation processes with respect to a sample of data comprises:
    executing the first evaluation process with respect to a first portion of the sample of data, the first portion of the sample of data comprising the first portion of text, the second portion of text, and the third portion of text; and
    executing a second evaluation process with respect to a second portion of the sample of data.

4. The system of claim 1, wherein said executing the plurality of evaluation processes with respect to a sample of data comprises:
    executing a second evaluation process that specifies a process to provide the regular expression to the regular expression engine for execution thereof.

5. The system of claim 1, wherein said selecting an evaluation process comprises:
    evaluating the determined respective performance characteristics as a multi-armed bandit problem.

6. The system of claim 1, wherein said executing the first evaluation process further comprises:
    identifying, without placing a call to the regular expression engine, a fourth portion of text in the sample of data that matches the first literal component; and
    failing to identify, without placing a call to the regular expression engine, a fifth portion of text in the sample of data subsequent to the fourth portion of text that matches the second literal component without placing a call to the regular expression engine.

7. A method, comprising:
    determining a first literal component in a regular expression;
    determining a second literal component subsequent to the first literal component in the regular expression;
    determining a first pattern component subsequent to the first literal component and prior to the second literal component in the regular expression;
    determining, based on the regular expression, a first evaluation process configured to identify text that matches the first literal component, the first pattern component, and the second literal component;
    executing the first evaluation process with respect to a sample of data, said executing the first evaluation process comprising:
        identifying, without utilizing a regular expression engine, a first portion of text in the sample of data that matches the first literal component,
        identifying, without utilizing the regular expression engine, a second portion of text in the sample of data subsequent to the first portion of text that matches the second literal component, and
        utilizing the regular expression engine to identify a third portion of text in the sample of data subsequent to the first portion of text and prior to the second portion of text that matches the first pattern component;
    determining, based on a performance characteristic of the first evaluation process with respect to the sample of data, to execute the first evaluation process with respect to further data; and
    executing the first evaluation process with respect to the further data to retrieve results that satisfy the first evaluation process.

8. The method of claim 7, further comprising:
    decomposing the first pattern component into a first pattern subcomponent, a third literal component, and a second pattern subcomponent.

9. The method of claim 7, wherein said executing the plurality of evaluation processes with respect to a sample of data comprises:
    executing the first evaluation process with respect to a first portion of the sample of data, the first portion of the sample of data comprising the first portion of text, the second portion of text, and the third portion of text; and
    executing a second evaluation process with respect to a second portion of the sample of data.

10. The method of claim 7, wherein said executing the plurality of evaluation processes with respect to a sample of data comprises:
    executing a second evaluation process that specifies a process to provide the regular expression to the regular expression engine for execution thereof.

11. The method of claim 7, wherein said selecting an evaluation process comprises:
    evaluating the determined respective performance characteristics as a multi-armed bandit problem.

12. The method of claim 7, wherein said executing the first evaluation process further comprises:
    identifying a fourth portion of text in the sample of data that matches the first literal component; and
    failing to identify a fifth portion of text in the sample of data subsequent to the fourth portion of text that matches the second literal component without placing a call to the regular expression engine.

13. A computer-readable storage medium having computer program logic recorded thereon that when executed by a processor circuit causes the processor circuit to perform a method comprising:
    determining a first literal component in a regular expression;
    determining a second literal component subsequent to the first literal component in the regular expression;
    determining a first pattern component subsequent to the first literal component and prior to the second literal component in the regular expression;
    executing a first evaluation process with respect to a sample of data, said executing the first evaluation process comprising:
        identifying, without utilizing a regular expression engine, a first portion of text in the sample of data that matches the first literal component,
        identifying, without utilizing the regular expression engine, a second portion of text in the sample of data subsequent to the first portion of text that matches the second literal component, and
        utilizing the regular expression engine to identify a third portion of text in the sample of data subsequent to the first portion of text and prior to the second portion of text that matches the first pattern component;
    determining, based on a performance characteristic of the first evaluation process with respect to the sample of data, to execute the first evaluation process with respect to further data; and
    executing the first evaluation process with respect to the further data to retrieve results that satisfy the first evaluation process.

14. The computer-readable storage medium of claim 13, wherein the method further comprises:
   decomposing the first pattern component into a first pattern subcomponent, a third literal component, and a second pattern subcomponent.

15. The computer-readable storage medium of claim 13, wherein said executing the plurality of evaluation processes with respect to a sample of data comprises:
   executing the first evaluation process with respect to a first portion of the sample of data, the first portion of the sample of data comprising the first portion of text, the second portion of text, and the third portion of text; and
   executing a second evaluation process with respect to a second portion of the sample of data.

16. The computer-readable storage medium of claim 13, wherein said executing the plurality of evaluation processes with respect to a sample of data comprises:
   executing a second evaluation process that specifies a process to provide the regular expression to the regular expression engine for execution thereof.

17. The computer-readable storage medium of claim 13, wherein said selecting an evaluation process comprises:
   evaluating the determined respective performance characteristics as a multi-armed bandit problem.

18. The computer-readable storage medium of claim 13, wherein said executing the first evaluation process further comprises:
   identifying a fourth portion of text in the sample of data that matches the first literal component; and
   failing to identify a fifth portion of text in the sample of data subsequent to the fourth portion of text that matches the second literal component without placing a call to the regular expression engine.

19. A system, comprising:
   a processor circuit; and
   a memory that stores program code that, when executed by the processor circuit, performs operations, the operations comprising:
      determining a first literal component, a first pattern component, and a second literal component in a regular expression;
      decomposing the first pattern component into a first patten subcomponent, a third literal component, and a second pattern subcomponent;
      determining a plurality of evaluation processes based on the regular expression, the plurality of evaluation processes comprising a first evaluation process and a second evaluation process, the first evaluation process configured to identify text that matches the first literal component, the first pattern component, and the second literal component;
      executing the plurality of processes with respect to a sample of data to determine performance characteristics including a determined performance characteristic respective to each evaluation process of the plurality of evaluation processes, said executing the plurality of evaluation processes comprising:
         executing the first evaluation process by:
            identifying a first portion of text in the sample of data that matches the first literal component,
            identifying a second portion of text in the sample of data subsequent to the first portion of text that matches the second literal component, and
            utilizing a regular expression engine to identify a third portion of text in the sample of data subsequent to the first portion of text and prior to the second portion of text that matches the first pattern component, and executing second evaluation process by:
            identifying the first portion of text in the sample of data that matches the first literal component,
            identifying a fourth portion of text in the sample of data subsequent to the first portion of text and prior to the second portion of text that matches the third literal component,
            identifying the second portion of text in the sample of data that matches the second literal component, and utilizing the regular expression engine to identify:
               a fifth portion of text in the sample of data subsequent to the first portion of text and prior to the fourth portion of text that matches the first pattern subcomponent, and
               a sixth portion of text in the sample of data subsequent to the fourth portion of text and prior to the second portion of text that matches the second pattern subcomponent;
      selecting an evaluation process of the plurality of evaluation processes based on the determined performance characteristics; and
      executing the selected evaluation process with respect to further data to retrieve results that satisfy the selected evaluation process.

20. A method comprising:
   determining a first literal component, a first pattern component, and a second literal component in a regular expression;
   decomposing the first pattern component into a first patten subcomponent, a third literal component, and a second pattern subcomponent;
   determining a plurality of evaluation processes based on the regular expression, the plurality of evaluation processes comprising a first evaluation process and a second evaluation process, the first evaluation process configured to identify text that matches the first literal component, the first pattern component, and the second literal component;
   executing the plurality of processes with respect to a sample of data to determine performance characteristics including a determined performance characteristic respective to each evaluation process of the plurality of evaluation processes, said executing the plurality of evaluation processes comprising:
      executing the first evaluation process by:
         identifying a first portion of text in the sample of data that matches the first literal component,
         identifying a second portion of text in the sample of data subsequent to the first portion of text that matches the second literal component, and
         utilizing a regular expression engine to identify a third portion of text in the sample of data subsequent to the first portion of text and prior to the second portion of text that matches the first pattern component, and
      executing second evaluation process by:
         identifying the first portion of text in the sample of data that matches the first literal component,
         identifying a fourth portion of text in the sample of data subsequent to the first portion of text and prior to the second portion of text that matches the third literal component, identifying the second portion of text in the sample of data that matches the second literal component, and
utilizing the regular expression engine to identify:
- a fifth portion of text in the sample of data subsequent to the first portion of text and prior to the fourth portion of text that matches the first pattern subcomponent, and
- a sixth portion of text in the sample of data subsequent to the fourth portion of text and prior to the second portion of text that matches the second pattern subcomponent;

selecting an evaluation process of the plurality of evaluation processes based on the determined performance characteristics; and executing the selected evaluation process with respect to further data to retrieve results that satisfy the selected evaluation process.

\* \* \* \* \*